(12) United States Patent
Saito et al.

(10) Patent No.: US 8,402,238 B2
(45) Date of Patent: Mar. 19, 2013

(54) STORAGE APPARATUS AND CONTROL METHOD THEREOF

(75) Inventors: Satoshi Saito, Odawara (JP); Taro Ishizaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 12/746,207

(22) PCT Filed: May 18, 2010

(86) PCT No.: PCT/JP2010/003322
§ 371 (c)(1),
(2), (4) Date: Jun. 4, 2010

(87) PCT Pub. No.: WO2011/145137
PCT Pub. Date: Nov. 24, 2011

(65) Prior Publication Data
US 2011/0289296 A1 Nov. 24, 2011

(51) Int. Cl.
*G06F 12/00* (2006.01)
(52) U.S. Cl. .................................. 711/162; 711/112
(58) Field of Classification Search .................. 711/162, 711/112
See application file for complete search history.

(56) References Cited

U.S. PATENT DOCUMENTS

| | | | |
|---|---|---|---|
| 6,275,898 B1 * | 8/2001 | DeKoning | 711/114 |
| 8,001,352 B1 * | 8/2011 | Chatterjee et al. | 711/165 |
| 2006/0236056 A1 | 10/2006 | Nagata | |
| 2007/0174583 A1 | 7/2007 | Shinkai et al. | |
| 2008/0229048 A1 * | 9/2008 | Murase et al. | 711/171 |
| 2008/0288560 A1 | 11/2008 | Kaji et al. | |
| 2009/0070541 A1 | 3/2009 | Yochai | |
| 2009/0198940 A1 * | 8/2009 | Ash et al. | 711/165 |
| 2009/0307424 A1 * | 12/2009 | Galloway et al. | 711/114 |

FOREIGN PATENT DOCUMENTS

| | | |
|---|---|---|
| EP | 1717689 A1 | 11/2006 |
| EP | 1826662 A2 | 8/2007 |
| JP | 2006-301820 | 11/2006 |
| JP | 2008-287327 | 11/2008 |
| WO | 2008118309 A1 | 10/2008 |

OTHER PUBLICATIONS

P. Scheuermann et al "Data Partitioning and Load Balancing in Parallel Disk Systems", VLDB Journal, Springer Verlag, Berlin, vol. 7, Feb. 1, 1998, pp. 48-66.

* cited by examiner

*Primary Examiner* — Hashem Farrokh
(74) *Attorney, Agent, or Firm* — Brundidge & Stanger, P.C.

(57) ABSTRACT

In order to prevent the degradation of performance of a storage apparatus caused by dynamic reallocation, the storage apparatus performs reassigning to a logical page the first physical page which is the physical page provided by the physical drive in Tier 1 which is the higher hierarchy than Tier 2 which is the hierarchy of the physical drive which provides the second physical page which is the physical page currently assigned to the logical page and, at the same time, by making the contents of the second physical page identical to the contents of the first physical page, performs the first migration for the logical page, associating and managing the second physical page and the first physical page and, when performing the second migration by reassigning the physical page provided by the physical drive in Tier 2 to the logical page to which the first physical page is assigned, and performs the second migration by reassigning the relevant second physical page to the logical page again when the second physical page is associated with the first physical page.

12 Claims, 36 Drawing Sheets

Fig. 11

PHYSICAL DRIVE MANAGEMENT TABLE 1100

| PHYSICAL DRIVE ID | PHYSICAL DRIVE ADDRESS | PHYSICAL PAGE ID | PHYSICAL PAGE USE STATUS |
|---|---|---|---|
| DISK1 | 0-999 | P-PAGE1 | BUSY |
| | 1000-1999 | P-PAGE2 | BUSY |
| | 2000-2999 | P-PAGE3 | BUSY |
| | 3000-3999 | P-PAGE4 | UNUSED |
| | 4000-4999 | P-PAGE5 | UNUSED |
| DISK2 | 0-999 | P-PAGE6 | BUSY |
| | 1000-1999 | P-PAGE7 | BUSY |
| DISK3 | 0-999 | P-PAGE8 | BUSY |
| | 1000-1999 | P-PAGE9 | BUSY |
| ... | ... | ... | ... |

LOGICAL UNIT MANAGEMENT TABLE 1200

| LOGICAL UNIT ID | LOGICAL UNIT ADDRESS | LOGICAL PAGE ID | PHYSICAL PAGE ASSIGNMENT STATUS |
|---|---|---|---|
| LU1 | 0-999 | L-PAGE0101 | ASSIGNED |
| | 1000-1999 | L-PAGE0102 | UNASSIGNED |
| | 2000-2999 | L-PAGE0103 | ASSIGNED |
| LU2 | 0-999 | L-PAGE0201 | UNASSIGNED |
| | 1000-1999 | L-PAGE0202 | ASSIGNED |
| LU3 | 0-999 | L-PAGE0301 | UNASSIGNED |
| | 1000-1999 | L-PAGE0302 | ASSIGNED |
| ... | ... | ... | ... |

PAGE MAPPING TABLE 1300

| LOGICAL PAGE ID | PHYSICAL PAGE ID |
|---|---|
| L-PAGE0101 | P-PAGE1 |
| L-PAGE0102 | NONE |
| L-PAGE0103 | P-PAGE3 |
| L-PAGE0104 | NONE |
| L-PAGE0105 | P-PAGE5 |
| L-PAGE0106 | NONE |
| L-PAGE0107 | P-PAGE7 |
| L-PAGE0108 | P-PAGE8 |
| L-PAGE0109 | P-PAGE9 |
| ... | ... |

PHYSICAL DRIVE INFORMATION MANAGEMENT TABLE 1400

| PHYSICAL DRIVE ID | RAID CONFIGURATION | TYPE | CHARACTERISTIC | HIERARCHY |
|---|---|---|---|---|
| DISK1 | 2D+2D | SSD | HIGH-PERFORMANCE | Tier1 |
| DISK2 | 3D+1P | FC | NORMAL | Tier2 |
| DISK3 | 3D+1P | FC | NORMAL | Tier2 |
| DISK4 | 3D+1P | FC | NORMAL | Tier2 |
| DISK5 | 3D+1P | FC | NORMAL | Tier2 |
| DISK6 | 7D+1P | S-ATA | LOW COST | Tier3 |
| DISK7 | 7D+1P | S-ATA | LOW COST | Tier3 |
| ... | ... | ... | ... | ... |

ACCESS FREQUENCY MANAGEMENT TABLE  1500

| LOGICAL UNIT ID | LOGICAL PAGE ID | ACCESS FREQUENCY |
|---|---|---|
| LU1 | L-PAGE0101 | 50 |
| | L-PAGE0102 | 100 |
| | L-PAGE0103 | 3 |
| LU2 | L-PAGE0201 | 0 |
| | L-PAGE0202 | 50 |
| LU3 | L-PAGE0301 | 3 |
| | L-PAGE0302 | 0 |
| ... | ... | ... |

ASSOCIATION MANAGEMENT TABLE 1700

| MIGRATION DESTINATION PHYSICAL PAGE ID (1711) | MIGRATION SOURCE PHYSICAL PAGE ID (1712) |
|---|---|
| P-PAGE1 | P-PAGE11 |
| P-PAGE2 | NONE |
| P-PAGE3 | NONE |
| P-PAGE4 | P-PAGE5 |
| P-PAGE5 | P-PAGE15 |
| P-PAGE6 | NONE |
| P-PAGE7 | NONE |
| P-PAGE8 | NONE |
| P-PAGE9 | NONE |
| P-PAGE10 | P-PAGE20 |
| ... | ... |

DEFAULT HIERARCHY TABLE 2000

| PRIORITY | HIERARCHY |
|---|---|
| 1 (MAXIMUM PRIORITY) | Tier2 |
| 2 | Tier1 |
| 3 | Tier3 |
| ... | ... |

DATA MIGRATION PROCESSING S2100

Fig. 23

INTER-HIERARCHY MIGRATION NECESSITY CONDITION TABLE 2300

| CURRENT HIERARCHY OF LOGICAL PAGE | CONDITION FOR MIGRATION TO HIGHER HIERARCHY (IF CONDITION BELOW IS SATISFIED, MIGRATE TO NEXT HIGHER HIERARCHY) NUMBER OF ACCESSES PER LOGICAL PAGE | CONDITION FOR MIGRATION TO LOWER HIERARCHY (IF CONDITION BELOW IS SATISFIED, MIGRATE TO NEXT LOWER HIERARCHY) NUMBER OF ACCESSES PER LOGICAL PAGE |
|---|---|---|
| Tier1 | (NONE) | 10 TIMES OR FEWER |
| Tier2 | 20 TIMES OR MORE | 5 TIMES OR FEWER |
| Tier3 | 10 TIMES OR MORE | (NONE) |
| ... | ... | ... |

Fig. 24

MIGRATION TARGET LOGICAL PAGE MANAGEMENT QUEUE 2400

| LOGICAL PAGE ID | MIGRATION SOURCE HIERARCHY | MIGRATION DESTINATION HIERARCHY |
|---|---|---|
| L-PAGE0101 | Tier1 | Tier2 |
| L-PAGE0102 | Tier1 | Tier2 |
| L-PAGE0103 | Tier1 | Tier2 |
| L-PAGE0201 | Tier2 | Tier1 |
| L-PAGE0202 | Tier2 | Tier1 |
| L-PAGE0301 | Tier3 | Tier2 |
| L-PAGE0302 | Tier3 | Tier2 |
| ... | ... | ... |

Fig. 29

DUPLICATION DEGREE MANAGEMENT TABLE 2900

| PHYSICAL PAGE ID | CURRENT DEGREE OF DUPLICATION | PREVIOUS DEGREE OF DUPLICATION |
|---|---|---|
| P-PAGE1 | 1 | 1 |
| P-PAGE2 | 1 | 1 |
| P-PAGE3 | 4 | 1 |
| P-PAGE4 | 2 | 2 |
| P-PAGE5 | 1 | 2 |
| P-PAGE6 | 1 | 1 |
| P-PAGE7 | 3 | 2 |
| P-PAGE8 | 2 | 2 |
| P-PAGE9 | 2 | 2 |
| ... | ... | ... |

PAGE MAPPING TABLE 1300

| LOGICAL PAGE ID (1311) | PHYSICAL PAGE ID (1312) |
|---|---|
| L-PAGE1 | P-PAGE1 |
| L-PAGE2 | NONE |
| L-PAGE3 | P-PAGE3 |
| L-PAGE4 | NONE |
| L-PAGE5 | P-PAGE3 |
| L-PAGE6 | NONE |
| L-PAGE7 | P-PAGE7 |
| L-PAGE8 | P-PAGE8 |
| L-PAGE9 | P-PAGE9 |
| ... | ... |

Fig. 31

INTER-HIERARCHY MIGRATION NECESSITY CONDITION TABLE 2300

| CURRENT HIERARCHY OF LOGICAL PAGE (2311) | AMOUNT OF CHANGE OF DUPLICATION DEGREE (CURRENT DEGREE OF DUPLICATION/PREVIOUS DEGREE OF DUPLICATION) | |
|---|---|---|
| | CONDITION FOR MIGRATION TO HIGHER HIERARCHY (IF CONDITION BELOW IS SATISFIED, MIGRATE TO NEXT HIGHER HIERARCHY) (2312) | CONDITION FOR MIGRATION TO LOWER HIERARCHY (IF CONDITION BELOW IS SATISFIED, MIGRATE TO NEXT LOWER HIERARCHY) (2313) |
| Tier1 | (NONE) | LOWER THAN 1/2 |
| Tier2 | 2 OR HIGHER | LOWER THAN 1/2 |
| Tier3 | 2 OR HIGHER | (NONE) |
| ... | ... | ... |

SEARCH Tier 1 FOR
PHYSICAL PAGES
WHOSE CONTENTS
ARE IDENTICAL

STORAGE APPARATUS AND CONTROL METHOD THEREOF

TECHNICAL FIELD

The present invention relates to a storage apparatus and a control method thereof, specifically to a technology for preventing the performance degradation of the storage apparatus caused by dynamic migration performed in units of small storage areas such as pages and the like.

BACKGROUND ART

Along with the increase of amount of data handled by the storage apparatus, it is even more required to, for example, utilize storage resources efficiently, construct an efficient platform for achieving operation at a minimum cost, and achieve flexible operation status permitting detailed support to the user. To satisfy these requirements, the provision of storage areas based on storage pools, the dynamic migration of storage resources by hierarchization, and others are being performed in units of small storage areas such as pages.

As for dynamic migration, for example, Patent Literature (PTL) 1 discloses, monitoring access frequencies of physical data, moving physical data of high access frequency to high-speed disk drives, moving physical data of low access frequency to low-speed disk drives.

PTL 2 discloses, as for migration performed in accordance with usage frequencies and the like of volumes, in order to permit appropriate monitoring of the performance of the target volume and re-migrating the data in a short time, copying all the data from the source volume to the target volume, switching the access path of the host to the target volume after copying, maintaining pair of copies between the volumes even after copying, managing the difference generated between the source volume and the target volume, monitoring the performance of the target volume with reference to the index in accordance with the type of the target volume, determining whether or not the status before data migration is to be restored in accordance with the monitoring result, and, if the status is to be restored, copying the differential data from the target volume to the source volume and switching the access path of the host to the source volume.

PTL 3 discloses, in the case of performing migration from a storage apparatus of high performance to a storage apparatus of low performance due to reduction of access frequency, when cancellation of migration is made for a reason that the processing performance is far lower than expected or other reasons, in order to solve problems such as the migration cannot be cancelled after the completion confirmation operation, or migration with the source and the target replaced needs to be performed again, and the like, based on the completion date and time of the performed migration and the update date and time of the volumes, determination is made on whether or not the selected source volume and the target volume were updated after completion of the performed migration, and, if both the selected source volume and the target volume are determined to have not been updated, cancellation of the migration performed is made by setting the storage subsystem so that the host computer accesses the source volume.

CITATION LIST

Patent Literature

PTL 1: US Patent Application Publication No. 2009/0070541, Specification
PTL 2: Japanese Patent Application Laid-open Publication No. 2006-301820
PTL 3: Japanese Patent Application Laid-open Publication No. 2008-287327

SUMMARY OF INVENTION

Technical Problem

Management in units of small storage areas such as pages, enables detailed monitoring and controlling compared with conventional methods in units of devices, volumes, or the like however, there is a problem that the differences in access frequencies among units of storage areas are likely to increase, that moving and migration among hierarchies occur frequently during dynamic migration, and that the performance of the storage apparatus is likely to be affected.

The present invention has been made in view of the above-mentioned background and the main purpose thereof is to provide a storage apparatus capable of preventing performance degradation of the storage apparatus caused by dynamic migration and a control method thereof.

Solution to Problem

An aspect of the present invention for achieving the above-mentioned purpose is a storage apparatus that performs writing and reading of data to a plurality of physical drives classified into hierarchies, in accordance with data I/O requests sent from an external device, provides to the external device a storage area of the physical drive in a unit of a logical unit that is a logical storage area, configures the logical unit by assigning a physical page that is a unit of a storage area of the physical drive, to a logical page that is a unit of a storage area of the logical unit, performs a first migration to the logical page by reassigning a first physical page that is the physical page provided by the physical drive of a first hierarchy that is the hierarchy higher than a second hierarchy that is the hierarchy of the physical drive providing a second physical page that is the physical page currently assigned to the logical page, and making contents of the second physical page identical with contents of the first physical page, associates the second physical page with the first physical page and manages the two, and performs a second migration by reassigning the second physical page to the logical page, when the first physical page is associated to the second physical page, at a time the second migration is performed by reassigning the physical page provided by the physical drive of the second hierarchy, to the logical page to which the first physical page is assigned.

The other problems disclosed by the present invention and the solutions therefor are described in the Description of Embodiments and the figures attached.

Advantageous Effects of Invention

According to the present invention, the performance degradation of the storage apparatus caused by dynamic migration can be prevented.

BRIEF DESCRIPTION OF DRAWINGS

FIG. 11 is an example of a physical drive management table 1100.

FIG. 12 is an example of a logical unit management table 1200.

FIG. 13 is an example of a page mapping table 1300.

FIG. 14 is an example of a physical drive information management table 1400.

FIG. 15 is an example of an access frequency management table 150.

FIG. 17 is an example of an association management table 1700.

FIG. 23 is an example of an inter-hierarchy migration necessity condition table 2300.

FIG. 24 is an example of a migration target logical page management queue 2400.

FIG. 29 is an example of a duplication degree management table 2900.

FIG. 30 is an example of a page mapping table 1300.

FIG. 31 is an example of an inter-hierarchy migration necessity condition table 2300.

DESCRIPTION OF EMBODIMENTS

Hereinafter, the embodiments of the present invention will be described with reference to the figures attached.

First Embodiment

Figure 1:
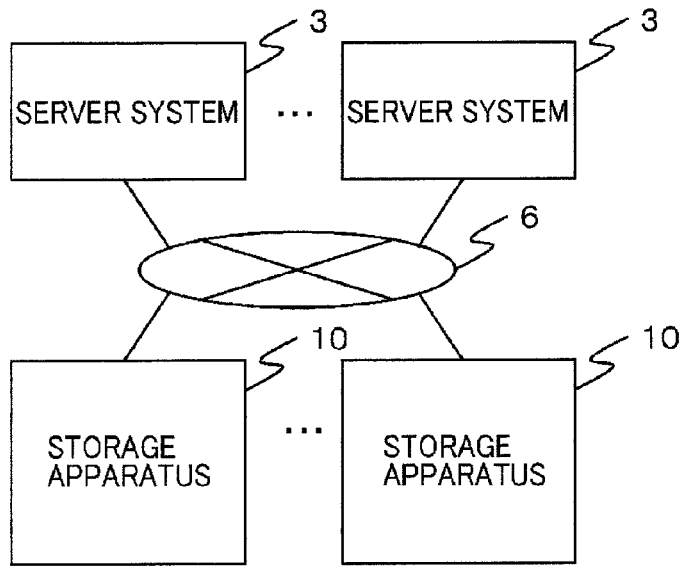
FIG. 1 is a diagram showing the schematic configuration of an information processing system 1.

FIG. 1 shows a schematic configuration of an information processing system 1 which is described as an embodiment. As shown in FIG. 1, the information processing system 1 is configured to include one or more server systems 3 and one or more storage apparatuses 10. The server systems 3 and the storage apparatuses 10 are communicably coupled via a storage network 6.

The storage network 6 is LAN (Local Area Network), WAN (Wide Area Network), SAN (Storage Area Network), the internet, a public telecommunication network, exclusive lines, or the like. The communication via the storage network 6 is performed according to the protocols of, for example, TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

The server system 3 is an information processing apparatus (computer) utilizing a storage area (data storage area) provided by the storage apparatus 10. The server system 3 is configured using a personal computer, a mainframe (Mainframe), an office computer and the like. The server system 3, for accessing the above-mentioned storage area, transmits a data frame (hereinafter abbreviated as frame) including data I/O requests (data write requests, data read requests, and the like) to the storage apparatus 10.

Figure 2:
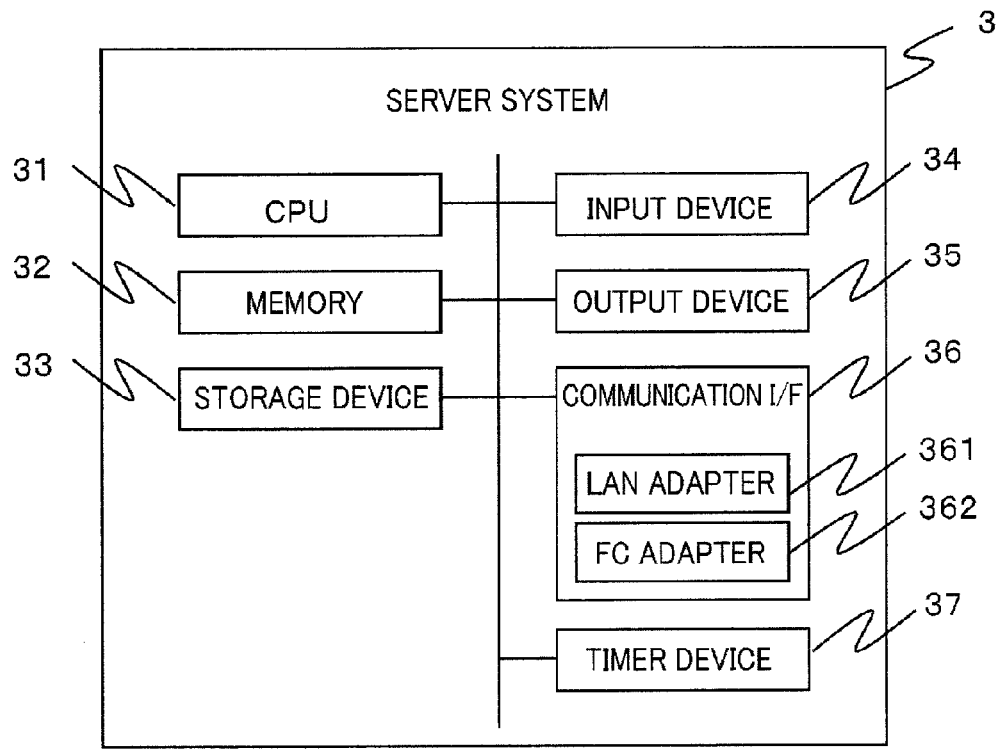
FIG. 2 is an example of the hardware configuration of a server device 3.

FIG. 2 is an example of the hardware of an information processing apparatus (computer) which can be utilized as a server system 3. As shown in FIG. 2, the apparatus includes a CPU 31, a volatile or non-volatile memory 32 (RAM or ROM), a storage device 33 (e.g. a hard disk drive or a semiconductor storage device (SSD)), an input device 34 such as a keyboard or a mouse, an output device 35 such as a liquid crystal display or a printer, a communication interface (hereinafter referred to as a communication I/F 36) such as an NIC (hereinafter referred to as a LAN adapter 361) or an HBA (hereinafter referred to as an FC adapter 362), and a timer device 37 configured using a timer circuit, an RTC, and the like.

Figure 3:
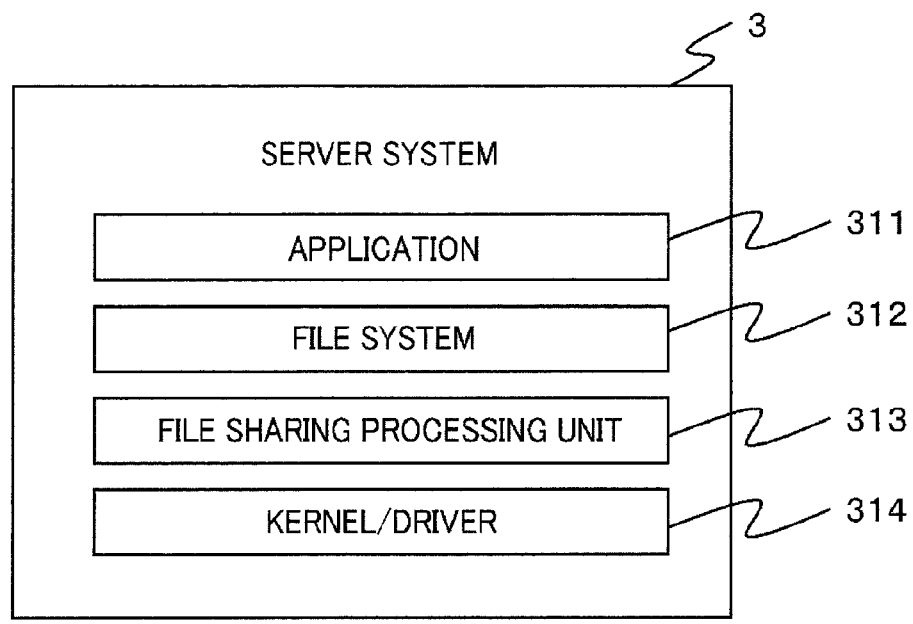
FIG. 3 is a diagram showing main functions which the server device 3 has.

FIG. 3 shows the main functions which the server system 3 has. As shown in FIG. 3, the server system 3 includes functions of an application 311, a file system 312, a file sharing processing unit 313, and a kernel/driver 314. Note that the functions shown in FIG. 3 are implemented by the CPU 31 in the server system 3 reading and executing the programs stored in the memory 32 and the storage device 33.

The application 311 is implemented by the software which utilizes the storage apparatus 10 as a data storage area. The software implementing the application 311 is, for example, a software which implements online systems and batch systems of a bank, a software which implements a billing system and an accounting information system in business firms and the like, a software which provides the Web service on the internet, a software which implements DBMS (Data Base Management System), and the like.

The file system 312, using logical volumes (LUs) provided by the storage apparatus 10, provides I/O function for the logical volumes (LUs) in units of files or directories to a client device (an external device) which accesses the relevant server system 3. The file systems 312 are, for example, FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, and the like.

The file sharing processing unit 313 provides a file sharing environment to the client device which accesses the relevant server system 3. The file sharing processing unit 313 is implemented using the protocols of the network file systems (distributed file systems), for example, NFS (Network File System), CIFS (Common Internet File System), AFS (Andrew File System), and the like.

The kernel/driver 314 is implemented by executing the kernel module and the driver module which implement the operating system (OS: Operating System). The kernel module includes therein, for the software executed in the server system 3, programs for implementing basic functions which the operating system has such as process management, process scheduling, storage area management, handling interruption requests from the hardware, and the like. The driver module includes therein, programs for the kernel module to communicate with hardware configuring the server system 3 and peripherals used by connecting to the server system 3.

Figure 4:
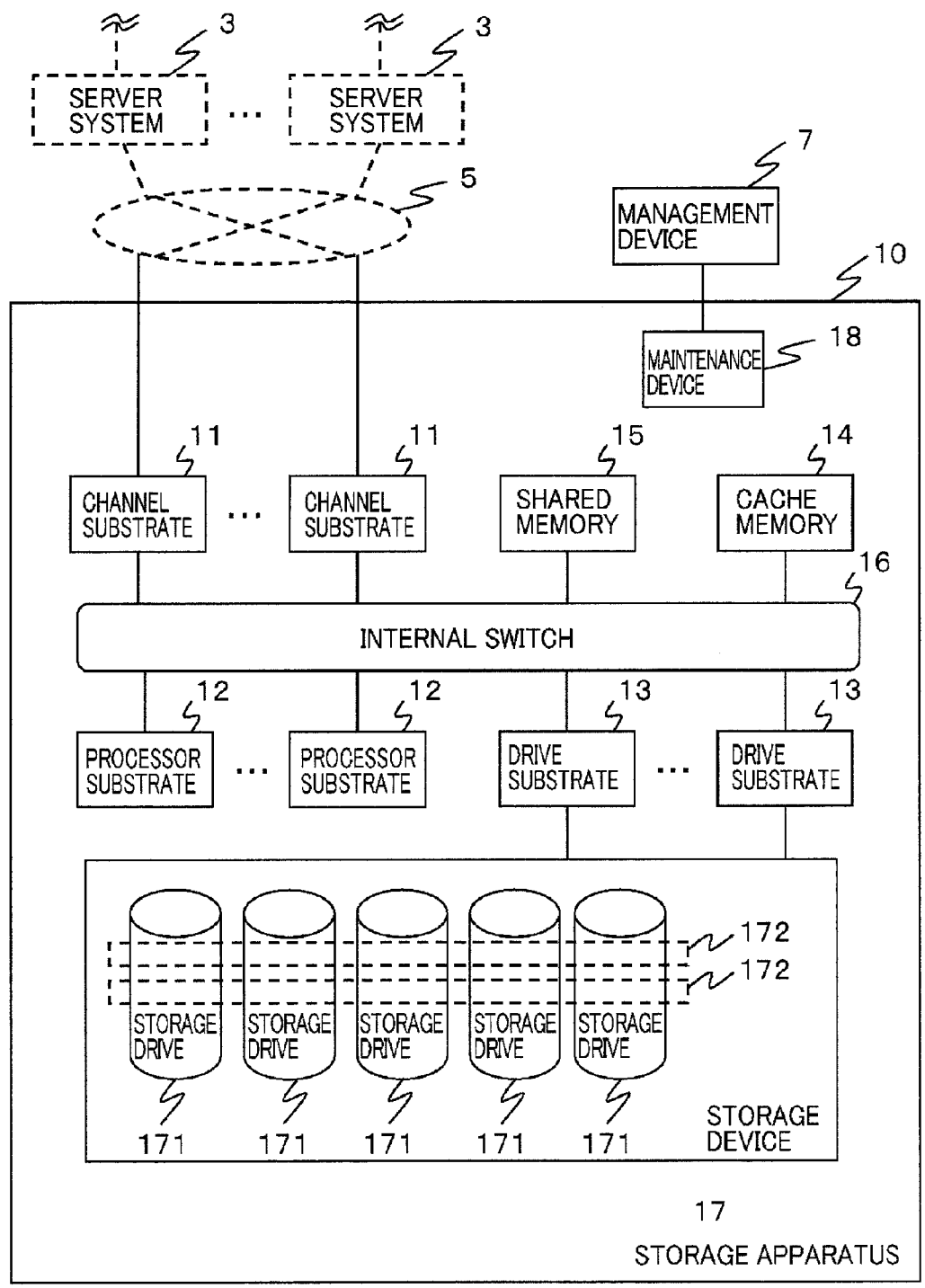
FIG. 4 is an example of the hardware configuration of a storage apparatus 10.

FIG. 4 shows an example of a hardware configuration of the storage apparatus 10. The storage apparatus 10 is, for example, a disk array device. The storage apparatus 10 accesses recording media in accordance with the above-mentioned I/O requests sent from the server system 3, and sends data and responses to the server system 3. As shown in the FIG. 4, this storage apparatus 10 includes one or more channel substrates 11, one or more processor substrates 12 (Micro Processor), one or more drive substrates 13, a cache memory 14 (Cache Memory), a shared memory 15 (Shared Memory), an internal switch 16, a storage device 17, and a maintenance device 18 (SVP: SerVice Processor). The channel substrates 11, the processor substrates 12, the drive substrates 13, the cache memory 14, and the shared memory 15 are mutually communicably coupled via the internal switch 16.

The channel substrates 11 receive frames transmitted from the server system 3, and sends frames including processing responses related to the data I/O requests included in the received frames (e.g. read data, read completion reports, write completion reports) to the server system 3. Note that, in the description below, frames are assumed to be Fibre Channel frames (FC frames (FC: Fibre Channel)).

The processor substrates 12, in accordance with the above-mentioned data I/O requests included in the frames which the channel substrates 11 received, perform processing related to data transfer performed among the channel substrates 11, the drive substrates 13, and the cache memory 14. The processor substrates 12 perform data (data read from the storage device 17, data to be written to the storage device 17) delivery between the channel substrates 11 and the drive substrates 13 performed via the cache memory 14, staging (reading data from the storage device 17) or destaging (writing data to the storage device 17) of data stored in the cache memory 14, and the like.

The cache memory 14 is configured using RAM (Random Access Memory) capable of high-speed access. The cache memory 14 stores therein, data to be written to the storage device 17 (hereinafter referred to as write data), data read from the storage device 17 (hereinafter referred to as read data), and the like. The shared memory 15 stores therein, various types of information used for controlling the storage apparatus 10.

The drive substrates 13 communicate with the storage device 17 when reading data from the storage device 17 and writing data to the storage device 17. The internal switch 16 is configured using a high-speed crossbar switch (Cross Bar Switch), for example. The communication performed via the internal switch 16 is performed according to the protocols of Fibre Channel, iSCSI, TCP/IP, and the like.

The storage device 17 is configured of a plurality of physical drives 171 which are physical storage media. The physical drives 171 are configured using hard disk drives of SAS (Serial Attached SCSI), SATA (Serial ATA), FC (Fibre Channel), PATA (Parallel ATA), SCSI, or other types and hardware such as a semiconductor storage device (SSD). Note that the storage device 17 may be contained in the same chassis as the storage apparatus 10 or may also be contained in a different chassis.

Figure 5:
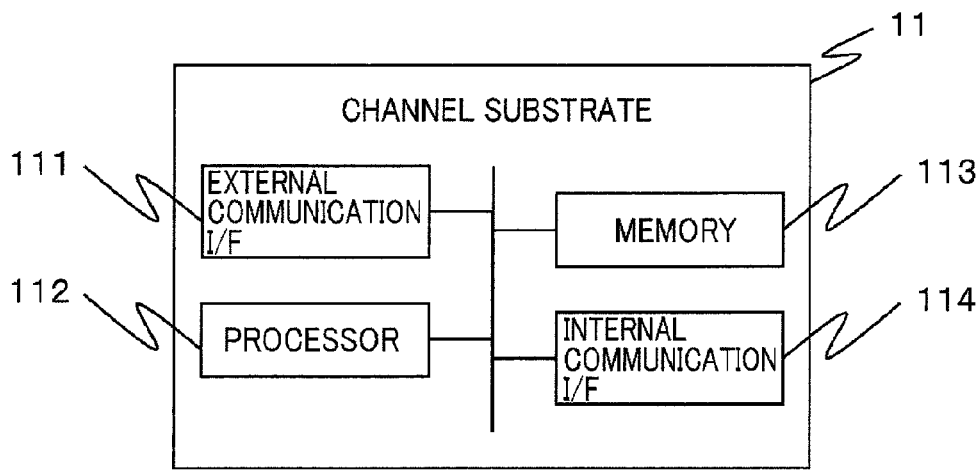
FIG. 5 is an example of the hardware configuration of a channel substrate 11.

FIG. 5 shows a hardware configuration of the channel substrate 11. As shown in FIG. 5, the channel substrate 11 includes an external communication interface (hereinafter referred to as an external communication I/F 111) having a port (communication port) for communication with the server device 3, a processor 112 (including a frame processing chip and a frame transfer chip described later), a memory 113, and an internal communication interface (hereinafter referred to as an internal communication I/F 114) having a port (communication port) for communication with the processor substrates 12.

The external communication I/F 111 is configured using an NIC (Network Interface Card), an HBA (Host Bus Adapter), and the like. The processor 112 is configured using a CPU (Central Processing Unit), an MPU (Micro Processing Unit), and the like. The memory 113 is RAM (Random Access Memory) or ROM (Read Only Memory). The memory 113 stores therein a microprogram. By the processor 112 reading the above-mentioned microprogram from the memory 113 and executing the same, various types of functions provided by the channel substrates 11 are implemented. The internal communication I/F 114 communicates with the processor substrates 12, the drive substrates 13, the cache memory 14, and the shared memory 15 via the internal switch 16.

Figure 6:
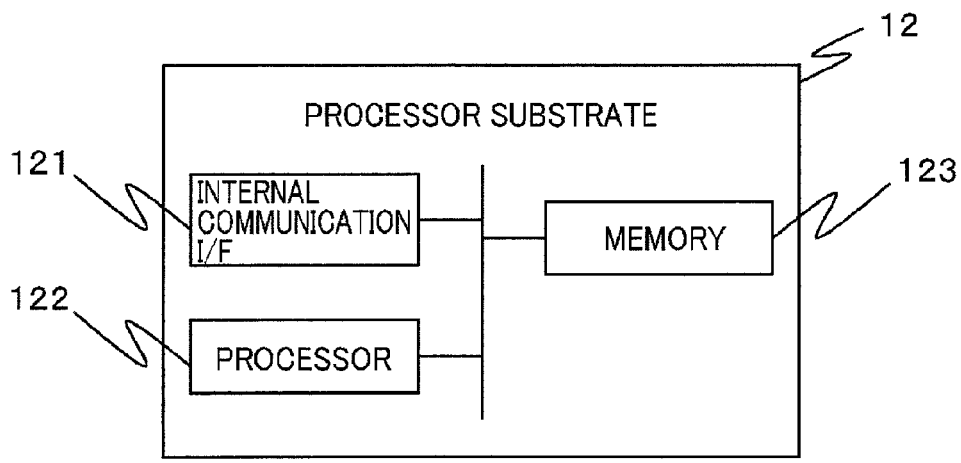
FIG. 6 is an example of the hardware configuration of a processor substrate 12.

FIG. 6 shows the hardware configuration of a processor substrate 12. The processor substrate 12 includes an internal communication interface (hereinafter referred to as an internal communication I/F 121), a processor 122, and a memory 123 (local memory) with higher access performance (capable of high-speed access) from the processor 122 compared with the shared memory 15. The memory 123 stores therein a microprogram. Various types of functions provided by the processor substrates 12 are implemented by the processor 122 reading the above-mentioned microprogram from the memory 123 and executing the same.

The internal communication I/F 121 communicates with the channel substrates 11, the drive substrates 13, the cache memory 14, and the shared memory 15 via the internal switch 16. The processor 122 is configured using a CPU, an MPU, DMA (Direct Memory Access), and the like. The memory 123 is RAM or ROM. The processor 122 can access both the memory 123 and the shared memory 15.

Figure 7:
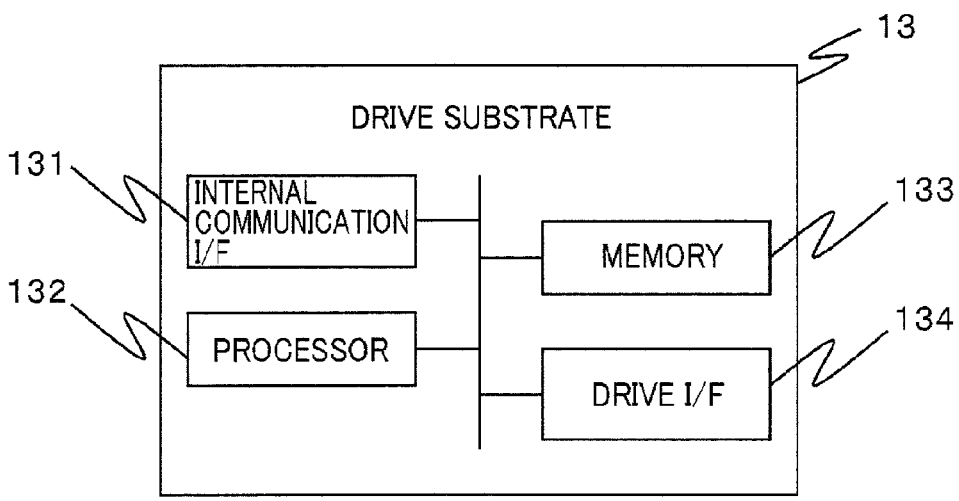
FIG. 7 is an example of the hardware configuration of a drive substrate 13.

FIG. 7 shows a hardware configuration of a drive substrate 13. The drive substrate 13 includes an internal communication interface (hereinafter referred to as an internal communication I/F 131), a processor 132, a memory 133, and a drive interface (hereinafter referred to as a drive I/F 134). The memory 133 stores therein a microprogram. Various types of functions provided by the drive substrate 13 are implemented by the processor 132 reading the above-mentioned microprogram from the memory 133 and executing the same. The internal communication I/F 131 communicates with the channel substrates 11, the processor substrates 12, the cache memory 14, and the shared memory 15 via the internal switch 16. The processor 132 is configured using a CPU, an MPU, and the like. The memory 133 is, for example, RAM or ROM. The drive I/F 134 performs communication with the storage device 17.

The maintenance device 18 shown in FIG. 4 performs the control of the respective components and status monitoring of the storage apparatus 10. The maintenance device 18 is a personal computer, an office computer, or the like. The maintenance device 18, via the internal switch 16 or communication means such as LAN, performs communication with the components of the storage apparatus 10 such as the channel substrates 11, the processor substrates 12, the drive substrates 13, the cache memory 14, the shared memory 15, and the internal switch 16 as needed, acquires operation information and the like from the respective components, and provides the same to the management device 7. Furthermore, the maintenance device 18, with reference to the control information and the operation information sent from the management device 7, sets, controls, and maintains the respective components (including installing and updating software).

The management device 7 is a computer communicably coupled to the maintenance device 18 via LAN or the like. The management device 7 includes a user interface using a GUI (Graphic User Interface) or a CLI (Command Line Interface) for controlling and monitoring the storage apparatus 10.

Figure 8:
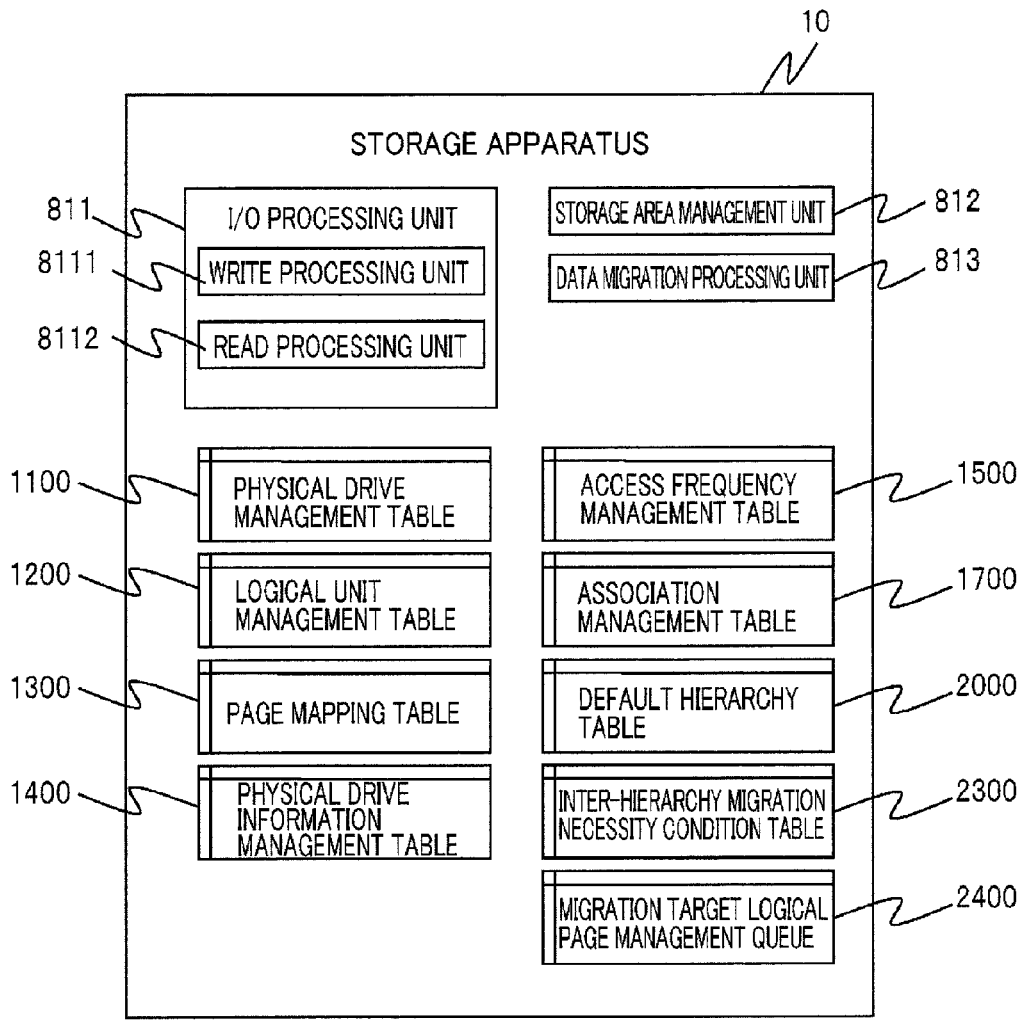
FIG. 8 shows main functions which the storage apparatus 10 has and tables which the storage apparatus 10 manages.

FIG. 8 shows the main functions related to the implementation of the services which the storage apparatus 10 provides to the server system 3 and the tables which the storage apparatus 10 manages. As shown in FIG. 8, the storage apparatus 10 includes an I/O processing unit 811, a storage area management unit 812, and a data migration processing unit 813. Among these, the I/O processing unit 811 includes a write processing unit 8111 which performs processing related to data write to the storage device 17 and a read processing unit 8112 which performs processing related to data read from the storage device 17. The storage area management unit 812 manages information related to the physical drives 171 and logical units 172 described later. The data migration processing unit 813 performs processing related to the later described data migration among hierarchies of the physical drives 171.

Note that the respective functions which the storage apparatus 10 includes are implemented by the hardware which the channel substrates 11, the processor substrates 12, and the drive substrates 13 of the storage apparatus 10 includes, or by the processors 112, 122, and 132 reading and executing the programs stored in the memories 113, 123, and 133.

As shown in FIG. 8, the storage apparatus 10 manages a physical drive management table 1100, a logical unit management table 1200, a page mapping table 1300, a physical drive information management table 1400, an access frequency management table 1500, an association management table 1700, a default hierarchy table 2000, an inter-hierarchy migration necessity condition table 2300, and a migration target logical page management queue 2400. The storage apparatus 10 stores these tables in the shared memory 15, for example. Details of these tables are described later.

Figure 9:
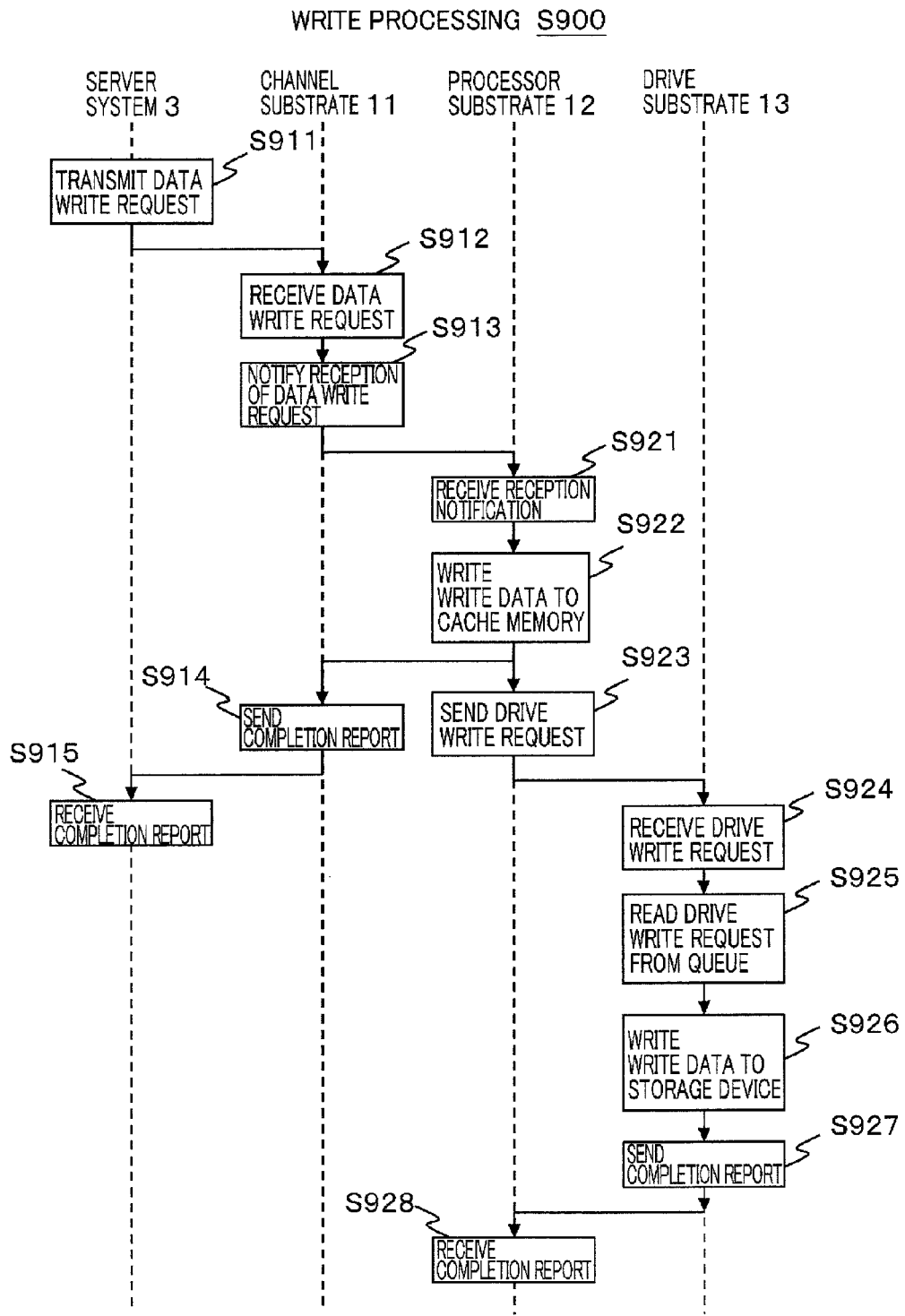
FIG. 9 is a flowchart describing write processing S900.

FIG. 9 is a flowchart describing the basic processing (hereinafter referred to as a write processing S900) which the write processing unit 8111 in the I/O processing unit 811 performs in a case the storage apparatus 10 receives a frame including a data write request from the server system 3. Hereinafter, write processing S900 is described with reference to FIG. 9. Note that, in the description below, the letter "S" attached before each reference sign indicates step.

The frame of the data write request sent from the server system 3 is received by the channel substrate 11 in the storage apparatus 10 (S911, S912). The channel substrate 11, receiving the frame, notifies that to the processor substrate 12 (S913).

The processor substrate 12, receiving the above-mentioned notification from the channel substrate 11 (S921), generates a drive write request based on the data write request of the relevant frame, and stores the generated drive write request in the cache memory 14. Then, the processor substrate 12 sends the write data to the drive substrate 13 (S922, S923). The channel substrate 11 sends a completion report to the server system 3 (S914), and the server system 3 receives the completion report (S915).

The drive substrate 13, receiving the drive write request, registers the same to the write processing waiting queue (S924). The drive substrate 13 reads the drive write request from the write processing queue as needed (S925). The drive substrate 13 reads the write data specified by the read drive write request from the cache memory 14, and writes the read write data to the physical drives 171 (S926).

Next, the drive substrate 13 notifies a report (completion report) that writing of the write data has completed in accordance with the drive write request to the processor substrate 12 (S927), and the processor substrate 12 receives the transmitted completion report (S928).

Figure 10:
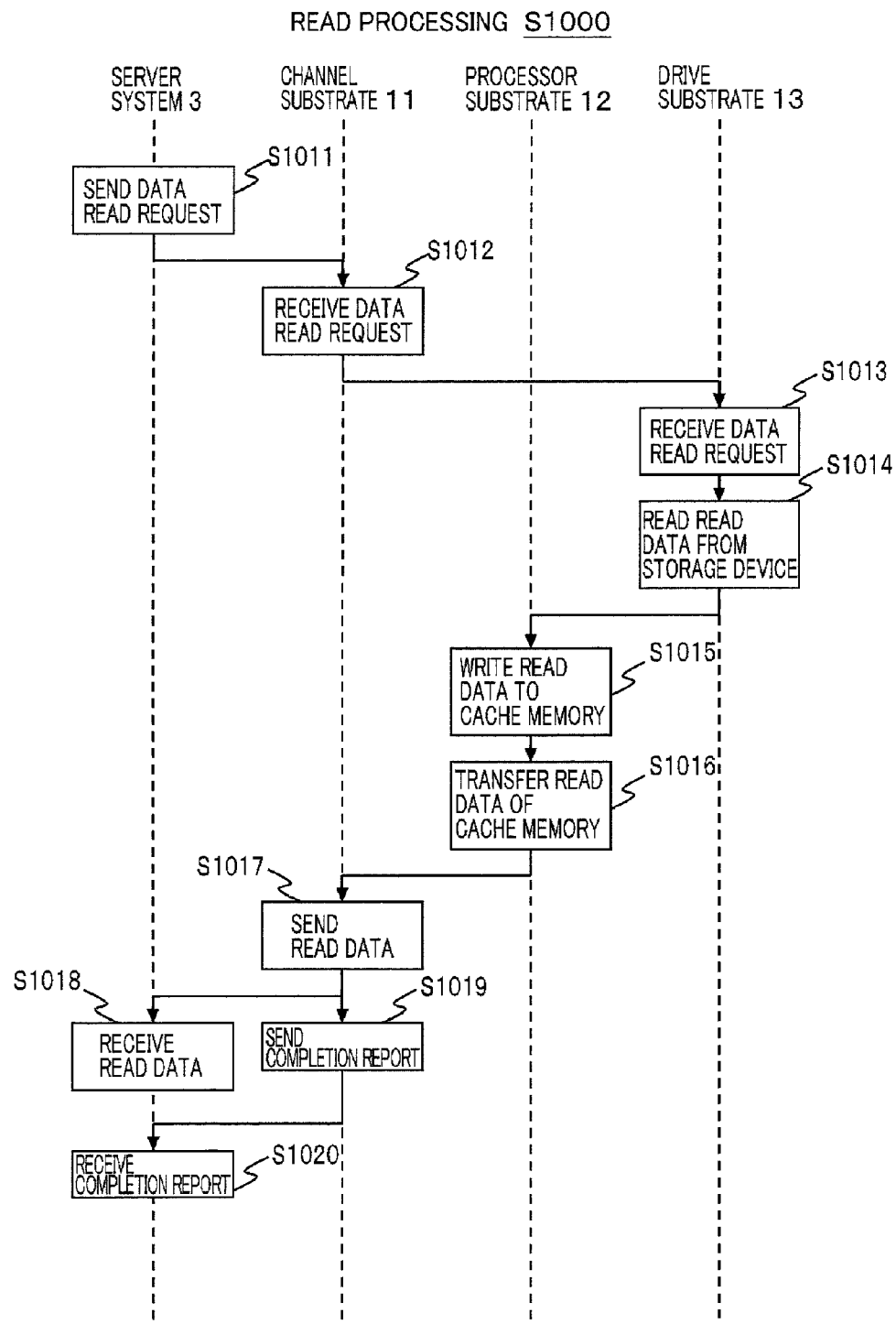
FIG. 10 is a flowchart describing read processing S1000.

FIG. 10 is a flowchart describing the I/O processing (hereinafter referred to as a read processing S1000) which the read processing unit 8112 in the I/O processing unit 811 of the storage apparatus 10 performs in a case the storage apparatus 10 receives a frame including a data read request from the server system 3. Hereinafter, the read processing S1000 is described with reference to FIG. 10.

The frame sent from the server system 3 is received by the channel substrate 11 in the storage apparatus 10 (S1011, S1012). The channel substrate 11, receiving the frame from the server device 3, notifies that to the processor substrate 12 and the drive substrate 13.

The drive substrate 13, receiving the above-mentioned notification from the channel substrate 11 (S1013), reads the data specified (e.g. specified by an LBA (Logical Block Address)) by the data read request included in the relevant frame from the storage device 17 (physical drives 171) (S1014). Note that, if read data exists in the cache memory 14 (in case of a cache hit), the read processing from the storage device 17 (S1014) is omitted. The processor substrate 12 writes the data read by the drive substrate 13 to the cache memory 14 (S1015). The processor substrate 12 transfers the data written to the cache memory 14 to the communication I/F as needed (S1016).

The channel substrate 11 sends the read data sent from the processor substrate 12 to the server system 3 sequentially (S1017, S1018). When the sending of the read data is completed, the channel substrate 11 sends a completion report to the server device 3 (S1019), and the server system 3 receives the sent completion report (S1020).

The storage apparatus 10 provides the storage area of the physical drives 171 to the server system 3 in logical units 172 (LU: Logical Units) which are logical storage areas configured through assigning the storage areas of the physical drives 171 in previously specified assignment units (hereinafter referred to as physical pages). The physical drives 171, for example, may also be implemented as storage areas provided by controlling multiple pieces of hardware (hard disk drives) by RAID (Redundant Array of Inexpensive (or Independent) Disks) or the like. In the description below, the physical drives 171 are assumed to be the storage areas provided by controlling multiple pieces of hardware by the RAID method.

The storage area management unit 812 of the storage apparatus 10 manages the information related to the physical drives 171 and the logical units 172. Note that the contents of these tables are, in addition to being accessed (updated, referred to, deleted) by the storage area management unit 812, may also be accessed by the user such as the operator and the like via the management device 7 or the maintenance device 18 as needed.

FIG. 11 is a table managed by the storage area management unit 812 (hereinafter referred to as the physical drive management table 1100). In the physical drive management table 1100, information related to the physical drives 171 is managed. As shown in FIG. 11, the physical drive management table 1100 is configured of one or more records each including items of a physical drive ID 1111 where the identifier of a physical drive 171 is set, a physical drive address 1112 where the information identifying the storage area of the physical drive 171 is set, a physical page ID 1113 where the information identifying the physical page of the physical drive 171 (hereinafter referred to as a physical page ID) is set, and a physical page use status 1114 where the information identifying whether or not the physical drive 171 is currently being used (assigned to a logical unit 172) is set. Note that, for the above-mentioned physical drive address 1112, an LBA (Logical Block Address) which is the information identifying the data block which is a unit of storage areas of the physical drives 171 (hereinafter referred to as a physical LBA) is assumed to be set.

FIG. 12 is a table managed by the storage area management unit 812 and a table where information related to the logical units 172 is managed (hereinafter referred to as the logical unit management table 1200). As shown in FIG. 12, the logical unit management table 1200 is configured of one or more records each including items of a logical unit ID 1211 where the identifier of a logical unit 172 is set, a logical unit address 1212 where the information identifying the storage area of the logical unit 172 (hereinafter referred to as a logical unit address) is set, a logical page ID 1213 where the information identifying the logical page which is the assignment unit of the storage area of the logical unit (hereinafter referred to as a logical page ID) is set, and a physical page assignment status 1214 where the information identifying whether or not a physical page is currently assigned to the logical unit 172 is set.

Note that, for the above-mentioned logical unit address 1212, an LBA (hereinafter referred to as a logical LBA) which is the information identifying the data block which is the unit of storage areas of the logical unit 172 as a logical unit address is assumed to be set. Furthermore, it is assumed that the data size of the data block in the logical unit 172 and the data size of the data block in the physical drive 171 are the same, and that the data size of the physical page and the data size of the logical page are the same.

FIG. 13 is a table managed by the storage area management unit 812 and is a table where the correspondence between the physical page IDs and the logical page IDs is managed (hereinafter referred to as the page mapping table 1300). As shown in FIG. 13, the page mapping table 1300 is configured of one or more records each of which is configured of a logical page ID 1311 where a logical page ID is set and a physical page ID 1312 where a physical page ID of the physical page currently assigned to the logical page ID is set.

Note that, as shown in FIG. 13, for a logical page to which no physical page is assigned, the information showing that no physical page is assigned to the logical page ("None" in this figure) is set in the physical page ID 1312 corresponding to the logical page ID.

FIG. 14 is a table managed by the storage area management unit 812 and is a table where information related to the attributes of the physical drives 171 is managed (hereinafter referred to as the physical drive information management table 1400). As shown in FIG. 14, the physical drive information management table 1400 is configured of one or more records each including items of a physical drive ID 1411 where a physical drive ID is set, a RAID configuration 1412 where the information indicating in what type of RAID configuration the physical drive is implemented is set, a type 1413 where information indicating the type of the physical drive 171 is set, a characteristic 1414 where the information indicating the characteristics of the physical drive 171 (the performance, cost and the like) is set, and a hierarchy 1415 where the information indicating the hierarchy set for the physical drive 171 is set.

Here, the term hierarchy is the information (attribute) which is set for each physical drive 171 in accordance with the characteristics of the physical drive 171 (the type, performance, reliability, cost and the like of the physical drive 171). The setting of a hierarchy for each physical drive 171 can be performed by the user such as the operator via the management device 7 or the maintenance device 18. Note that, in the present embodiment, a plurality of hierarchies are set for physical drives in descending order of performance and cost (provision cost per unit storage area). The present embodiment assumes that the hierarchy is higher as the performance increases while the hierarchy is lower as the performance degrades. Furthermore, it is assumed that, for the respective physical drives 171, the hierarchies identified by the identifiers "Tier 1," "Tier 2," and "Tier 3," . . . are set in descending order (the hierarchy is higher as the number is smaller).

The data migration processing unit 813 in the storage apparatus 10 constantly monitors the access frequency of a logical page, ascertains the hierarchy of the physical page appropriate for the assignment to the logical page in accordance with the access frequency of the logical page, and, when the hierarchy assigned to the logical page is different from the ascertained hierarchy, changes the correspondence between the logical page and the physical page in the page mapping table 1300 (hereinafter, the processing relating to this change is referred to as data migration). In data migration, the data migration processing unit 813 duplicates the contents of the physical page currently assigned to the logical page to the physical page to be newly assigned to the logical page. Note that the data migration can be classified into a case where the physical page assigned to the logical page is changed from the physical page in a lower hierarchy to the physical page in a higher hierarchy (hereinafter referred to as the logical page migration to the higher hierarchy) and the case where the physical page assigned to the logical page is changed from a higher hierarchy to a lower hierarchy (hereinafter referred to as the logical page migration to the lower hierarchy).

FIG. 15 is a table in which the result of monitoring (acquiring) the access frequency of each logical page by the data migration processing unit 813 (hereinafter referred to as the access frequency management table 1500) is stored. As shown in FIG. 15, the access frequency management table 1500 is configured of one or more records each including items of a logical unit ID 1511 where a logical unit ID is set, a logical page ID 1512 where a logical page ID is set, and an access frequency 1513 where the access frequency (accesses per unit time) of the logical page is set.

Figure 16:
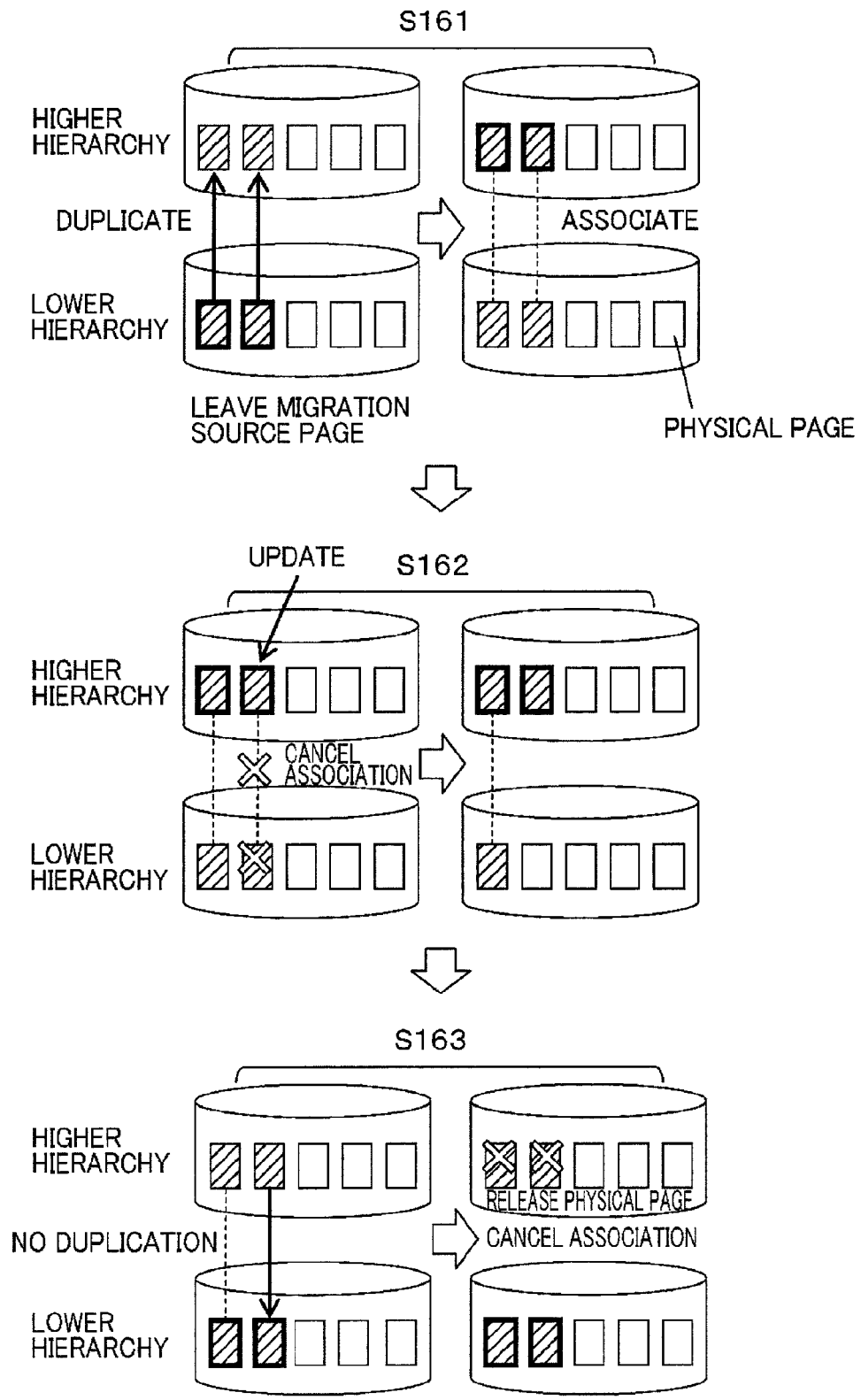
FIG. 16 is a diagram describing the processing performed by a data migration processing unit 813.

FIG. 16 is a diagram describing the processing performed in data migration by the data migration processing unit 813. As shown in FIG. 16, when migrating a logical page to a higher hierarchy (first migration), the data migration processing unit 813 duplicates the data stored in the physical page (second physical page) assigned to the logical page before the migration to the physical page (first physical page) assigned to the logical page after the migration. Furthermore, in this duplication, the data migration processing unit 813 associates the migration source physical page with the migration destination physical page, and registers the same to the association management table 1700 described later (manages (stores) the correspondence between the migration source physical page and the migration destination physical page) (S161).

In a case the migration source physical page and the migration destination physical page are associated and if the data stored in the migration destination physical page is changed by updating, deleting or the like, the data migration processing unit 813 cancels the above-mentioned association (S162).

Meanwhile, when migrating logical pages to a lower hierarchy (second migration), the data migration processing unit 813 determines whether or not a physical page in the lower hierarchy of the migration destination (second physical page) associated with the physical page (first physical page) assigned to the logical page before the migration exists and, if the associated physical page exists, by reassigning the physical page (second physical page) to the logical page, that is, without duplicating data from the first physical page to the second physical page, performs the migration to the lower hierarchy of the logical page.

Meanwhile, if a physical page in the lower hierarchy of the migration destination (second physical page) associated with the physical page (first physical page) assigned to the logical page before the migration does not exist, the data migration processing unit 813 duplicates the data stored in the physical page (first physical page) assigned to the logical page before the migration to the physical page (second physical page) assigned to the logical page after the migration (S163).

As described above, the data migration processing unit 813, when migrating a logical page to a higher hierarchy, associates the migration source physical page (second physical page) with the migration destination physical page (first physical page) (S161). Then, when migrating the logical page (logical page to which the first physical page is assigned) to a lower hierarchy, if a physical page in the lower hierarchy of the migration destination (second physical page) associated with the physical page (first physical page) assigned to the logical page before the migration exists, by reassigning the physical page to the logical page, that is, by reusing the contents of the physical page (second physical page) remaining in the physical drive 171 in the lower hierarchy with the contents unchanged, the data migration processing unit 813 performs the migration to the lower hierarchy of the logical page without data duplication, and therefore, can complete the data migration to the lower hierarchy without any load given on the storage apparatus 10 for duplication and prevent the performance degradation of the storage apparatus 10 accompanied by the data migration.

Furthermore, as no data duplication is accompanied, the migration of logical pages to the lower hierarchy can be completed in a short time (approximately an amount of time equivalent to the time required for changing the assignment of a physical page to a logical page). Meanwhile, if a succeeding migration exists in which the migration to the higher hierarchy must be started after a free area is generated in the higher hierarchy, the succeeding migration can be smoothly started, and the processing time of the entire migration processing can be reduced.

Note that the data migration processing unit 813, when migrating a logical page to the higher hierarchy, if the migration source physical page (second physical page) is associated with the migration destination physical page (first physical page) and the contents of the migration destination physical page (first physical page) (data stored in the relevant physical page) is changed, cancels the above-mentioned association (S162) and, in that case, when migrating the logical page to the lower hierarchy, duplicates the data stored in the physical page (first physical page) currently assigned to the relevant logical page to the physical page assigned to the logical page after the migration (S163), and therefore, guarantees that the contents of the post-migration logical page is the latest and can perform the migration safely.

FIG. 17 is a table in which the result of associating migration source physical pages with migration destination physical pages (hereinafter referred to as the association management table 1700) is managed. As shown in FIG. 17, the association management table 1700 is configured of one or more records each including items of a migration destination physical page ID 1711 where the physical page ID of the physical page which is the migration source when migrating a logical page to the higher hierarchy is set and a migration source physical page ID 1712 where the physical page ID of the physical page which is the migration destination in the migration is set.

Note that, in the association management table 1700 shown in FIG. 17, three or more types of association accompanied by data migration among hierarchies are mixed. In FIG. 17 for example, in the record in the fourth row, the migration destination physical page "P-PAGE4" and the migration source physical page "P-PAGE5" are associated while, in the record in the fifth row, the "P-PAGE5" is associated as the migration destination physical page of the "P-PAGE15." In FIG. 17, the records in which "None" is set for the migration source physical page ID 1712 exist, which indicates a case where the association with the corresponding migration destination physical page ID 1711 does not exist or is cancelled.

Figure 18:
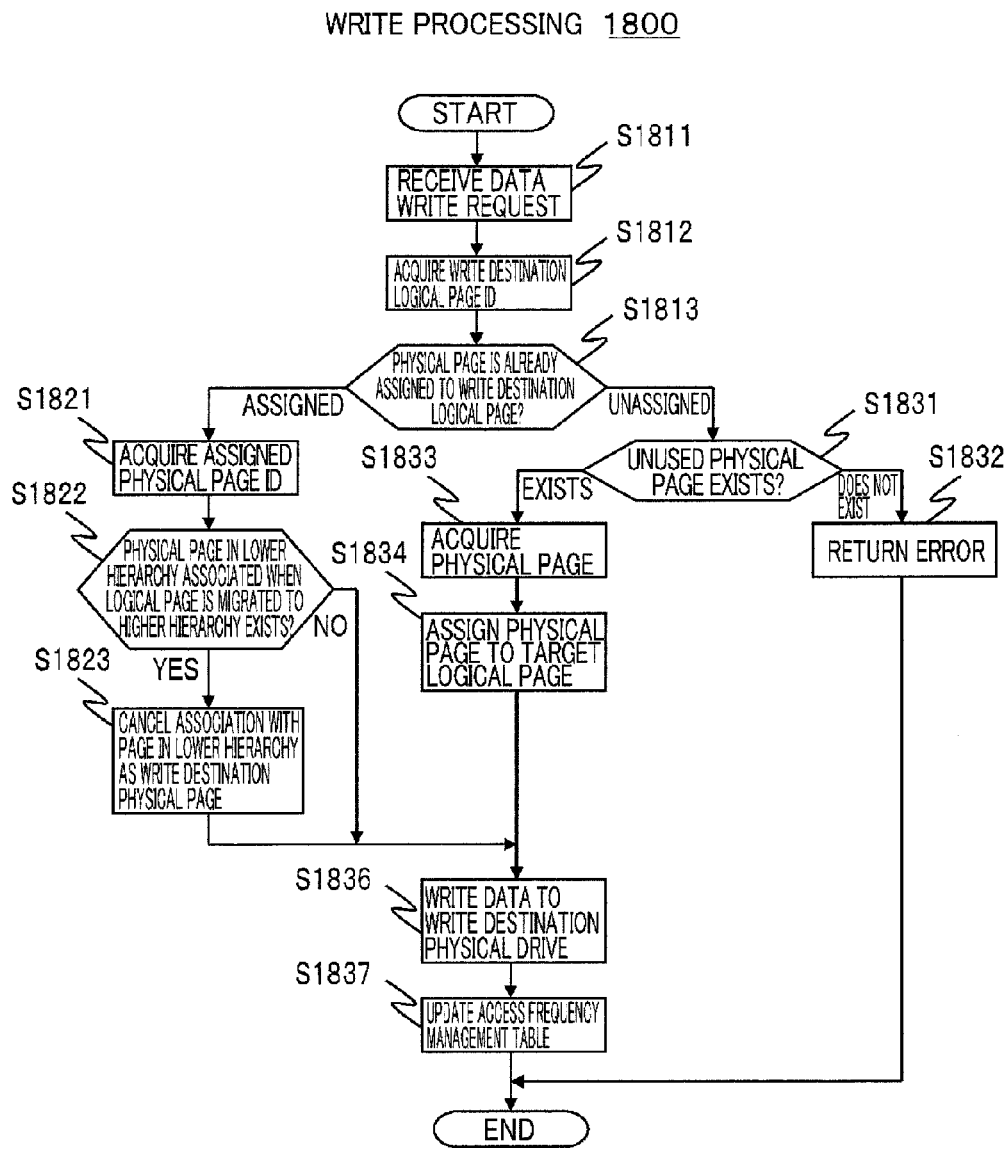
FIG. 18 is a flowchart describing write processing S1800.

FIG. 18 is a flowchart describing the processing (hereinafter referred to as a write processing S1800) which the write processing unit 8111 in the I/O processing unit 811 of the storage apparatus 10 performs in a case the storage apparatus 10 receives a frame including a data write request from the server system 3. The processing shown in the FIG. 18 assumes that the write processing S900 described in FIG. 9 is performed. The I/O processing unit 811 performs the processing shown in FIG. 18 in collaboration with the storage area management unit 812 and the data migration processing unit 813 as needed.

The write processing unit 8111 receives the frame of the data write request sent from the server system 3 and acquires the contents of the frame (S1811).

Figure 19:
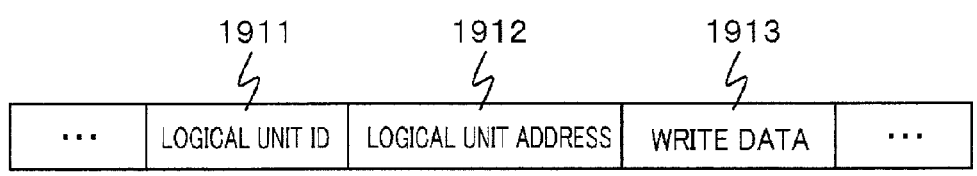
FIG. 19 is a structure of a data write request frame.

FIG. 19 shows the structure of the data write request frame transmitted from the server system 3. As shown in FIG. 19, in the data write request 1900, a write data 1913, a logical unit ID 1911 of the write destination logical unit of the write data, and a logical unit address 1912 of the write destination are set.

Then, the write processing unit 8111, from the logical unit management table 1200, acquires the logical page ID associated with the logical unit ID and the logical unit address acquired from the frame (S1812). Next, the write processing unit 8111 refers to the contents of the physical page assignment status 1214 of the acquired logical page ID of the logical unit management table 1200, and determines whether or not a physical page is assigned to the logical page identified by the relevant logical page ID (hereinafter also referred to as the target logical page) (S1813). If a physical page is assigned (S1813: Already assigned), the unit 511 proceeds to S1821 and, if no physical page is assigned (S1813: Unassigned), proceeds to S1831.

At S1821, the write processing unit 8111 refers to the page mapping table 1300 and acquires the physical page ID assigned to the logical page ID acquired at S1813. Next, the write processing unit 8111 refers to the association management table 1700 and determines whether or not a physical page ID (physical page ID set for the migration source physical page ID 1712 in the association management table 1700) associated with the physical page ID (physical page ID set for the migration destination physical page ID 1711 in the association management table 1700) acquired at S1821 exists, that is, whether or not a physical page associated with the physical page of the relevant physical page ID when the logical page to which the physical page of the acquired physical page ID is assigned was migrated to the higher hierarchy in the past exists (S1822).

If such physical page exists (S1822: YES), the write processing unit 8111 cancels the association by deleting the records of the relevant physical page from the association management table 1700 (or setting "None" for the contents of the migration source physical page ID 1712 corresponding to the relevant physical page ID) (S1823). That is, the association is cancelled because the contents of the relevant physical page will be updated afterwards. Note that, along with the cancellation of the association, for the physical page use status 1114 in the physical drive management table 1100 of the physical page ID associated with the relevant physical page ID, "Unused" is set. Then, the processing proceeds to S1836. Meanwhile, such physical page does not exist (S1822: NO), the processing proceeds to S1836.

At S1836, the write processing unit 8111 refers to the physical drive management table 1100 and writes the write data to the physical drive corresponding to the logical unit ID and the logical unit address acquired from the frame at S1811 (the area specified by the physical drive address 1112 of the physical drive specified by the physical drive ID 1111). Then, the write processing unit 8111 updates the contents of the target logical page access frequency 1513 (S1837).

At S1831, the write processing unit 8111 refers to the physical drive management table 1100 and checks whether an unused physical page exists or not (whether or not a physical drive where "Unused" is set for the physical page use status 1114 exists). If an "Unused" physical page exists (S1831: Exists), the processing proceeds to S1833 and, if no "Unused" page exists (S1831: Does not exist), the processing returns an error to the request source (server system 3) (S1832).

At S1833, the write processing unit 8111 refers to the physical drive management table 1100 and acquires an unused physical page. Note that, in this acquisition, the write processing unit 8111, refers to the physical drive management table 1100, as well as the default hierarchy table 2000 shown in FIG. 20 and the above-mentioned physical drive information management table 1400, and acquires the physical page in accordance with the priority set in the default hierarchy table 2000. Note that the contents of the default hierarchy table 2000 are accessed and set by the user such as the operator as needed, via the management device 7 or the maintenance device 18, for example.

Next, the write processing unit 8111 assigns the physical page acquired at S1833 to the target logical page (S1834). Specifically, the write processing unit 8111 acquires an unused physical page ID from the physical drive management table 1100, and sets the acquired physical page ID to the physical page ID 1312 corresponding to the logical page ID 1311 of the target logical page in the page mapping table 1300. Furthermore, the write processing unit 8111 sets "Busy" as the physical page use status 1114 of the acquired physical page ID in the physical drive management table 1100, and sets "Assigned" for the physical page assignment status 1214 of the logical page ID of the target logical page in the logical unit management table 1200. Then, the processing proceeds to S1836.

Figures 20, 21:
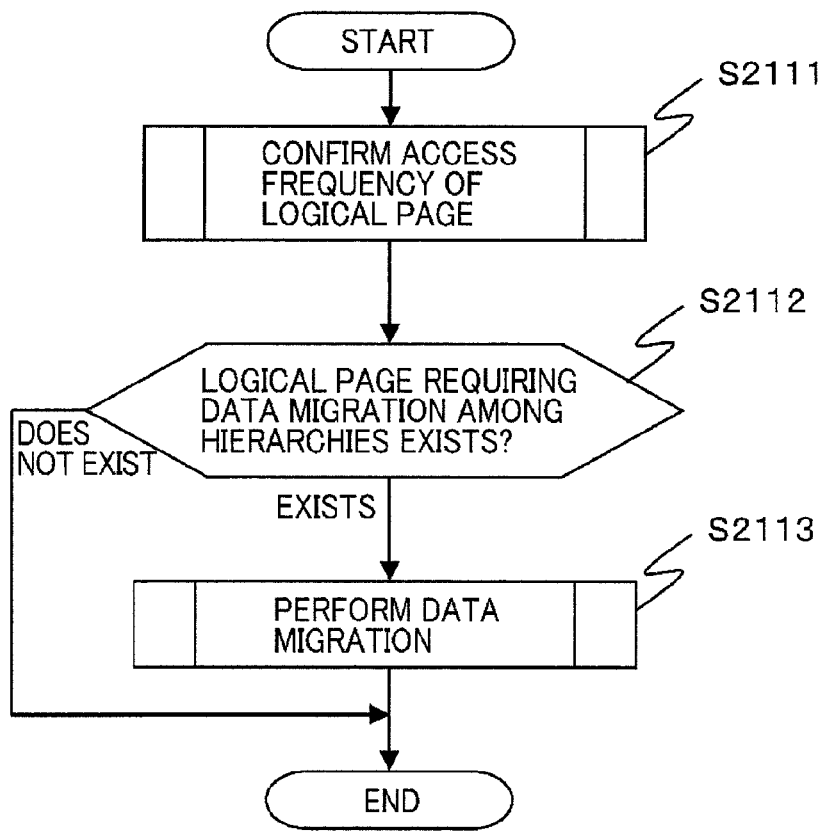
FIG. 20 is an example of a default hierarchy table 2000.
FIG. 21 is a flowchart describing data migration processing S2100.

FIG. 21 is a flowchart describing the processing (hereinafter referred to as the data migration processing S2100) performed by the data migration processing unit 813 in the storage apparatus 10. The data migration processing S2100 is performed on a schedule or timing (regular or irregular) set by the user such as the operator via the management device 7 or the maintenance device 18. Hereinafter, with reference to FIG. 21, data migration processing S2100 is described. Note that the data migration processing unit 813 performs the processing shown in the figure in collaboration with the storage area management unit 812 as needed.

Firstly, the data migration processing unit 813 confirms the contents of the access frequency management table 1500 (S2111) and determines whether or not a logical page requiring data migration among hierarchies exists (S2112). If a logical page requiring data migration among hierarchies exists (S2112: Exists), the data migration processing unit 813 determines the data migration method and performs the data migration (S2113). If no logical page requiring data migration exists (S2112: Does not exist), the processing ends.

Figure 22:
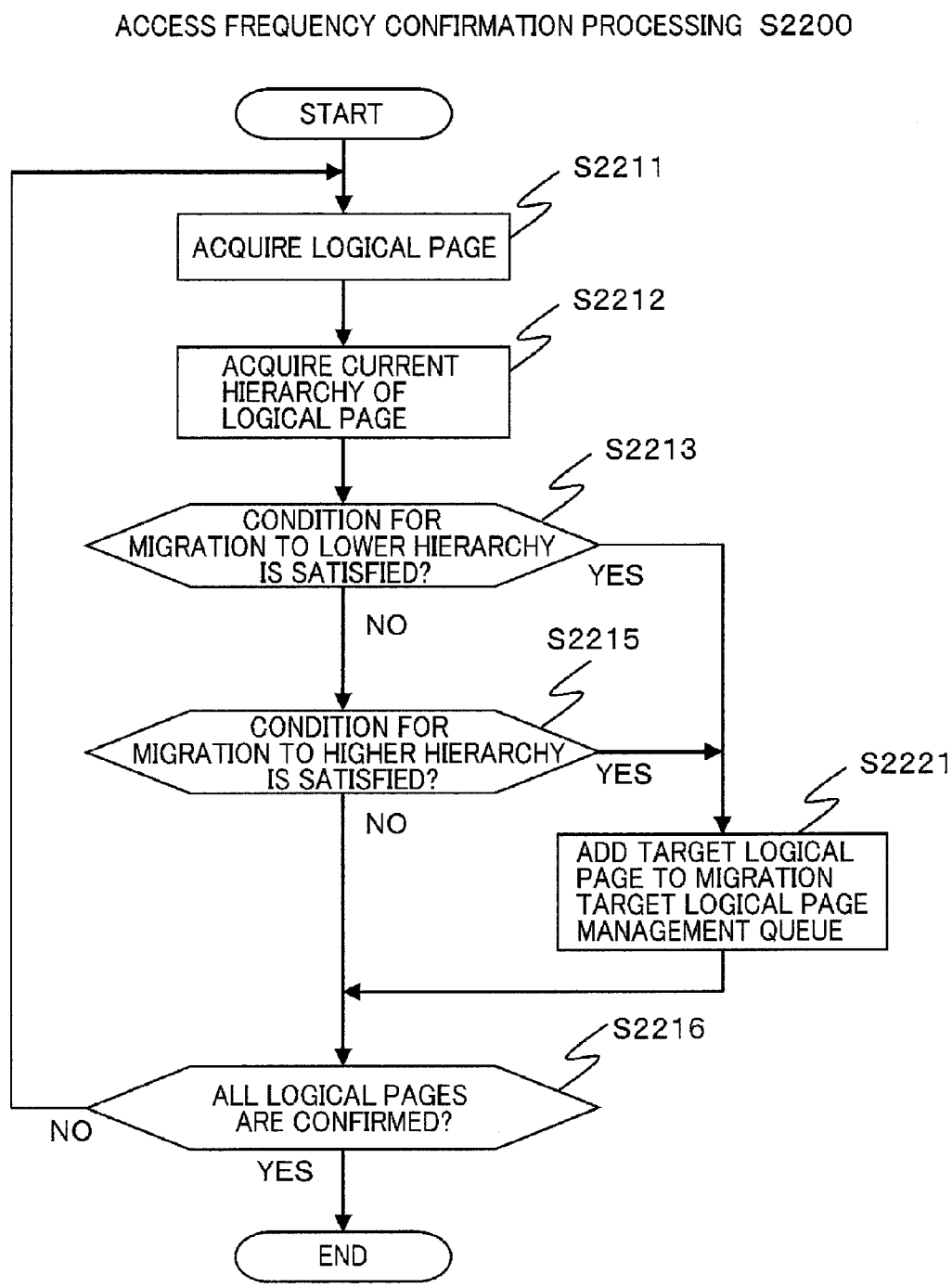
FIG. 22 is a flowchart describing access frequency confirmation processing S2200.

FIG. 22 is a flowchart describing the processing at S2111 in FIG. 21 (hereinafter referred to as the access frequency confirmation processing S2200). Hereinafter the access frequency confirmation processing S2200 is described with reference to FIG. 22.

Firstly, the data migration processing unit 813 acquires the logical page ID from the logical unit management table 1200 (S2211), compares the acquired logical page ID with the page mapping table 1300, the physical drive management table 1100, and the physical drive information management table 1400, and acquires the current hierarchy of the logical page of the acquired logical page ID (hereinafter referred to as the target logical page) (S2212).

Next, the data migration processing unit 813 compares the access frequency of the target logical page acquired from the access frequency management table 1500 with the inter-hierarchy migration necessity condition table 2300 shown in FIG. 23 and determines whether or not the target logical page satisfies the condition for migration to the lower hierarchy 2313 (S2213). Note that the contents of the inter-hierarchy migration necessity condition table 2300 are accessed and set by the user such as the operator as needed via the management device 7 or the maintenance device 18, for example. If the condition for migration to the lower hierarchy 2313 is satisfied (S2213: YES), the processing proceeds to S2221 and, if the condition 2313 is not satisfied (S2213: NO), the processing proceeds to S2215.

At S2221, the data migration processing unit 813 adds the record of the target logical page to the migration target logical page management queue 2400 shown in FIG. 24, and then proceeds to S2216. Note that, as shown in FIG. 24, the migration target logical page management queue 2400 includes each items of a logical page ID 2411, a migration source hierarchy 2412, and a migration destination hierarchy 2413. Note that the data migration processing unit 813, when adding the above-mentioned record, acquires the migration source hierarchy 2412 and the migration destination hierarchy 2413 from the inter-hierarchy migration necessity condition table 2300 and sets the same for the record to be added.

At S2215, the data migration processing unit 813 compares the access frequency of the target logical page acquired from the access frequency management table 1500 with the inter-hierarchy migration necessity condition table 2300 shown in FIG. 23 and determines whether or not the target logical page satisfies the condition for migration to the higher hierarchy 2312. If the condition for migration to the higher hierarchy 2312 is satisfied (S2215: YES), the processing proceeds to S2221 and the data migration processing unit 813 adds the record of the target logical page to the migration target logical page management queue 2400. If the condition 2312 is not satisfied (S2215: NO), the processing proceeds to S2216.

At S2216, the data migration processing unit 813 determines whether or not all the logical pages in the logical unit management table 1200 have been acquired (determined). If any logical pages that are not acquired yet exist (S2216: NO), the processing returns to S2211. If all the logical pages have been acquired (S2216: YES), the processing ends.

Figure 25:
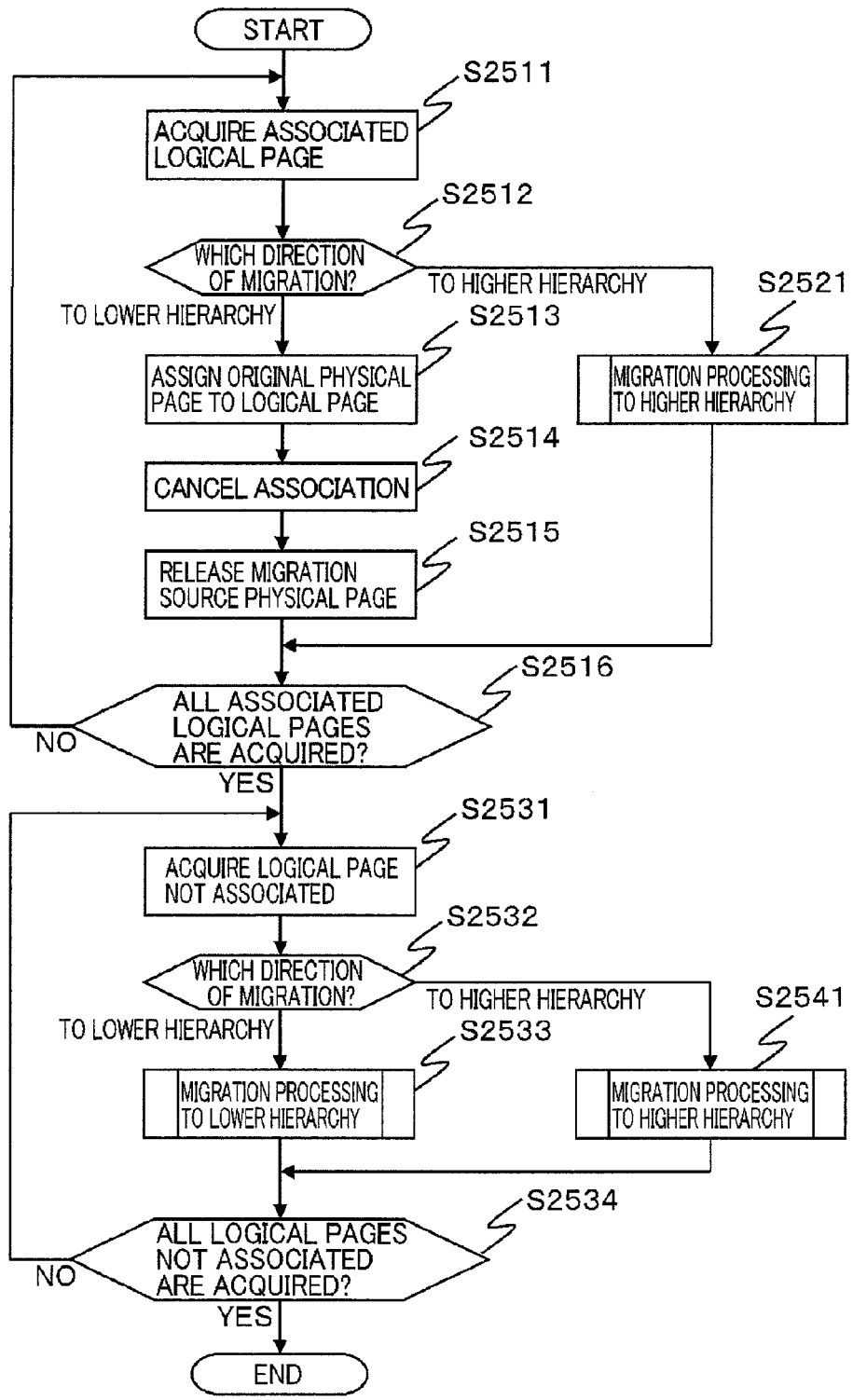
FIG. 25 is a flowchart describing a migration performing processing S2500.

FIG. 25 is a flowchart describing the processing at S2113 in FIG. 21 (hereinafter referred to as the migration performing processing S2500). Hereinafter, with reference to FIG. 25, the migration performing processing S2500 is described.

Firstly, the data migration processing unit 813 compares the migration target logical page management queue 2400, the page mapping table 1300, and the association management table 1700 and, among the logical pages registered to the migration target logical page management queue 2400, acquires the logical page (logical page ID) whose physical page is made to correspond (whose physical page ID is set for the migration source physical page ID 1712) to the physical page currently made to correspond to the logical page (the physical page specified by the migration destination physical page ID 1711) (S2511).

Next, the data migration processing unit 813 refers to the migration target logical page management queue 2400 and determines whether the direction of migrating the acquired logical page (hereinafter referred to as the target logical page) is to the higher hierarchy or to the lower hierarchy (S2512). If the migration is to the higher hierarchy (S2512: Upward), the processing proceeds to S2521 and performs the migration processing to the higher hierarchy. Note that the details of this processing are described later. After performing the migration processing, the processing proceeds to S2516.

Meanwhile, if the migration is to the lower hierarchy (S2512: Downward), the data migration processing unit 813 changes the contents of the physical page ID 1312 corresponding to the logical page ID 1311 of the target logical page in the page mapping table 1300 to the physical page ID of the migration source physical page made to correspond to the target logical page in the association management table 1700 (S2513). Furthermore, the data migration processing unit 813 cancels the association by setting "None" for the migration source physical page ID 1712 corresponding to the physical page (migration destination physical page ID 1711) of the target logical page in the association management table 1700 (S2514). Furthermore, the data migration processing unit 813 releases the relevant physical page by setting "Unused" for the physical page use status 1114 of the physical page made to correspond to the target logical page in the physical drive management table 1100 (S2515).

At S2516, the data migration processing unit 813 determines whether or not all the logical pages to which the migration source physical pages are made to correspond have been acquired (acquired at S2511). If all the logical pages have been acquired (S2516: YES), the processing proceeds to S2531 and, if all the logical pages are not acquired (S2516: NO), the processing returns to S2511.

At S2531, the data migration processing unit 813 acquires the logical page not acquired at S2511 (hereinafter referred to as the target logical page) among the logical pages registered to the migration target logical page management queue 2400.

Next, the data migration processing unit 813 refers to the migration target logical page management queue 2400 and determines whether the direction of migrating the acquired logical page (hereinafter referred to as the target logical page) is to the higher hierarchy or to the lower hierarchy (S2532). If the migration is to the higher hierarchy (S2532: Upward), the processing proceeds to S2541 and performs the migration processing to the higher hierarchy. Note that the details of this processing are described later. After performing the migration processing, the processing proceeds to S2534. Meanwhile, if the migration is to the lower hierarchy (S2532: Downward), the processing proceeds to S2533 and performs the migration processing to the lower hierarchy. Note that the details of this processing are described later. After performing the migration processing, the processing proceeds to S2534.

At S2534, the data migration processing unit 813 determines whether or not all the logical pages to which the migration source physical pages are not made to correspond have been acquired (acquired at S2531). If all the logical pages are not acquired (S2534: NO), the processing returns to S2531 and, if all the logical pages have been acquired (S2534: YES), the processing ends.

Note that, when acquiring a logical page not associated at S2531 from the migration target logical page management queue 2400, the logical page must be acquired ensuring that the migration with the page as the target is performed after the migration destination page is released. Specifically, for example, the logical page not associated is sorted in the migration destination hierarchy 2413 and then sorted in the migration source hierarchy 2412 so that the logical page is acquired in the order after sorting.

As described above, at the migration performing processing S2500, when migrating a logical page associated with a physical page (the logical page that is assigned the migration source physical page to the physical page assigned to the logical unit (the logical page to which a value is set for the migration source physical page ID 1712) in the association management table 1700) (S2511 to S2516), if the migration is to the lower hierarchy (S2512: Downward), no data duplication or migration occurs. Therefore, nearly no load is placed on the storage apparatus 10. Furthermore, as no duplication or migration is accompanied, the migration of logical pages is completed immediately.

Furthermore, as described above, at the migration performing processing S2500, the migration processing for logical pages associated with physical pages (S2511 to S2516) is prioritized over the migration processing for logical pages not associated with physical pages (S2531 to S2534). Therefore, taking into consideration the entire migration performing processing S2500, compared with the case where the migration processing for logical pages not associated with physical pages (S2531 to S2534) is prioritized, the migration processing for logical pages associated with physical pages (S2511 to S2516) is completed earlier, and the effect of the migration in the migration processing for logical pages associated with physical pages (S2511 to S2516) (the effect of the optimum data allocation in each hierarchy) can be acquired earlier.

Figure 26:
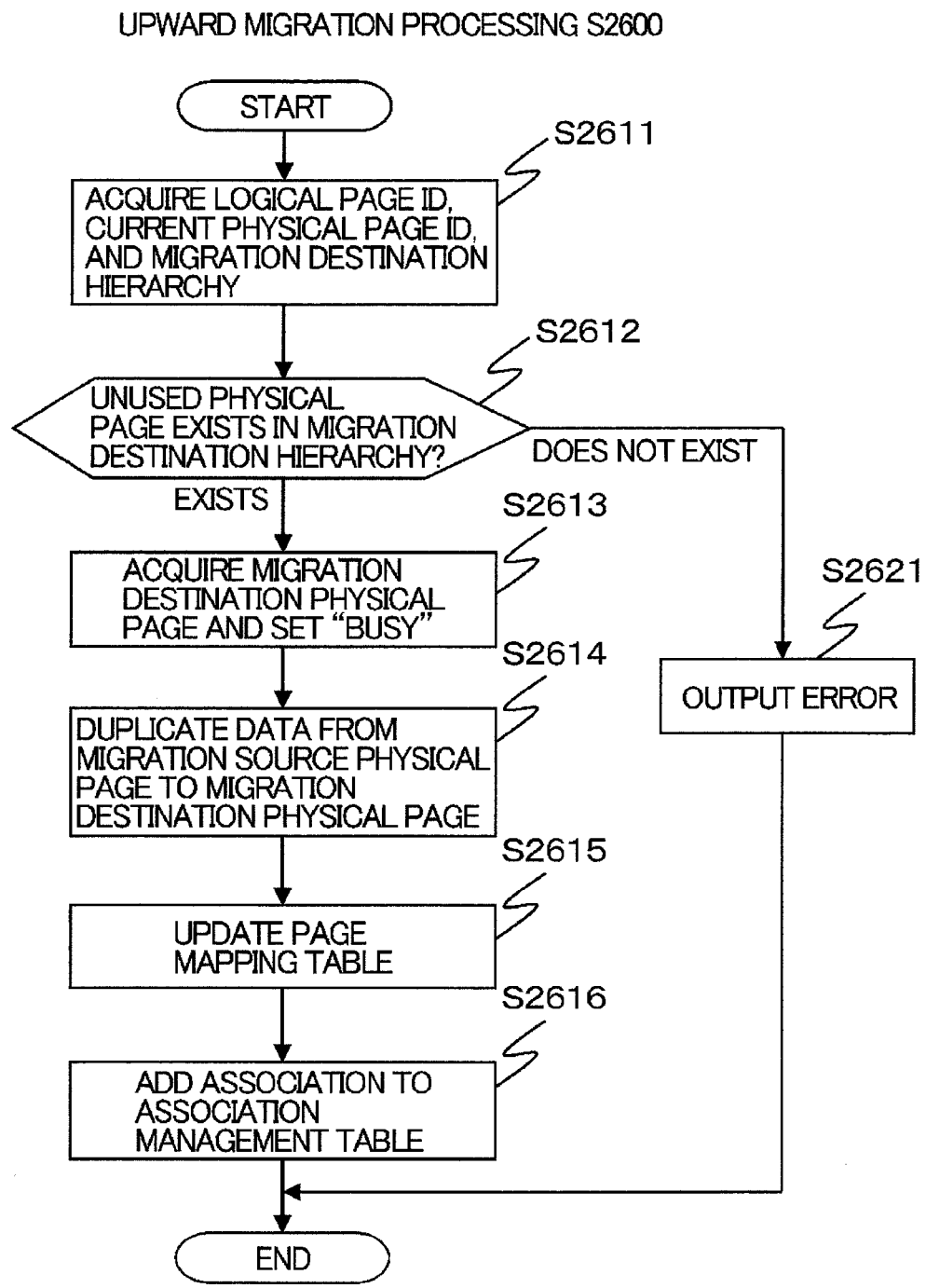
FIG. 26 is a flowchart describing upward migration processing S2600.

FIG. 26 is a flowchart describing the migration processing to the higher hierarchy (hereinafter referred to as the upward migration processing S2600) at S2521 and S2541 in FIG. 25. Hereinafter, the upward migration processing S2600 is described with reference to FIG. 26.

Firstly, the data migration processing unit 813 refers to the migration target logical page management queue 2400 and the page mapping table 1300, and acquires the logical page ID of the target logical page, the physical page ID of the physical page currently assigned to the logical page ID (migration source physical page), and the migration destination hierarchy (S2611).

Next, the data migration processing unit 813 refers to the physical drive management table 1100 and the physical drive information management table 1400, and checks whether an unused physical page exists in the higher hierarchy of the migration destination or not (S2612). If no unused physical page exists (S2612: Does not exist), the data migration processing unit 813 outputs an error to the management device 7 or the maintenance device 18 (S2621).

Meanwhile, if an unused physical page exists (S2612: Exists), the data migration processing unit 813 acquires the unused physical page in the higher hierarchy, and sets "Busy" for the physical page use status 1114 of the acquired physical page in the physical drive management table 1100 (S2613).

Next, the data migration processing unit 813 duplicates (not migrates) the data stored in the migration source physical page to the migration destination physical page (S2614).

Next, the data migration processing unit 813 changes the contents of the physical page ID 1312 corresponding to the logical page ID 1311 of the target logical page in the page mapping table 1300 to the physical page ID of the migration destination physical page (S2615). Note that, if the de-duplication function which is described with the second embodiment is performed in the storage apparatus 10, for all the logical pages to which the migration source physical page is assigned, the data migration processing unit 813 reassigns migration destination physical pages (changes the contents of the physical page ID 1312 corresponding to the relevant logical page (logical page ID 1311) to the physical page ID of the migration destination physical page).

Then, the data migration processing unit 813 registers the association between the migration destination physical page and the migration source physical page to the association management table 1700 (S2616). Note that, during migration to the higher hierarchy, the migration source physical page is not released even after the migration.

Figure 27:
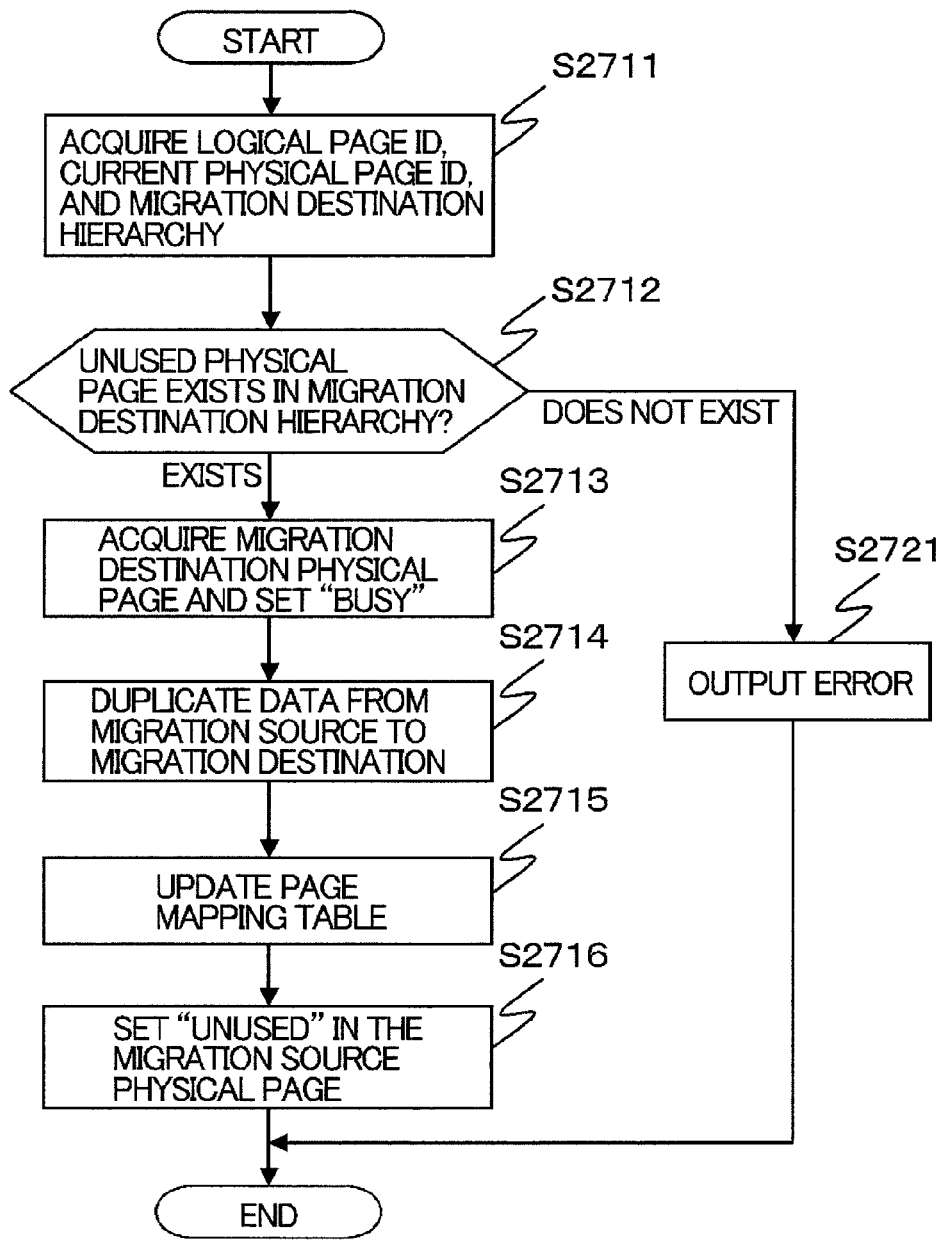
FIG. 27 is a flowchart describing downward migration processing S2700.

FIG. 27 is a flowchart describing the migration processing to the lower hierarchy (hereinafter referred to as the downward migration processing S2700) at S2533 in FIG. 25. Hereinafter, the downward migration processing S2700 is described with reference to FIG. 27.

Firstly, the data migration processing unit 813 refers to the migration target logical page management queue 2400 and the page mapping table 1300, and acquires the logical page ID of the target logical page, the physical page ID of the physical page currently assigned to the logical page ID (migration source physical page), and the migration destination hierarchy (S2711).

Next, the data migration processing unit 813 refers to the physical drive management table 1100 and the physical drive information management table 1400, and checks whether an unused physical page exists in the lower hierarchy of the migration destination or not (S2712). If no unused physical page exists (S2712: Does not exist), the data migration processing unit 813 outputs an error to the management device 7 or the maintenance device 18 (S2721).

Meanwhile, if an unused physical page exists (S2712: Exists), the data migration processing unit 813 acquires the unused physical page in the lower hierarchy, and sets "Busy" for the physical page use status 1114 of the acquired physical page in the physical drive management table 1100 (S2713).

Next, the data migration processing unit 813 duplicates the data stored in the migration source physical page to the migration destination physical page (S2714).

Next, the data migration processing unit 813 changes the contents of the physical page ID 1312 corresponding to the logical page ID 1311 of the target logical page in the page mapping table 1300 to the physical page ID of the migration destination physical page (S2715). Note that, if the de-duplication function which is described in the second embodiment is performed in the storage apparatus 10, for all the logical pages to which the migration source physical page is assigned, the data migration processing unit 813 reassigns migration destination physical pages (changes the contents of the physical page ID 1312 corresponding to the relevant logical page (logical page ID 1311) to the physical page ID of the migration destination physical page).

Next, the data migration processing unit 813 sets "Unused" for the physical page use status 1114 of the migration source physical page in the physical drive management table 1100 (S2716). That is, in data migration to the lower hierarchy, the migration source physical page is released after the migration.

As described above, the storage apparatus 10, when performing the migration to the lower hierarchy by reassigning the physical page in the lower hierarchy (second physical page) to the logical page to which the physical page in the higher hierarchy (first physical page) is assigned, if the second physical page is associated to the first physical page, performs the migration by reassigning the second physical page to the logical page unless the contents of the first physical page are updated. Therefore, no data duplication is accompanied in the migration to the lower hierarchy and the migration can be completed immediately, which can prevent the performance degradation of the storage apparatus 10 caused by dynamic reallocation.

Second Embodiment

As described with reference to FIG. 21, in the first embodiment, the data migration processing unit 813 determines the necessity of data migration among hierarchies in accordance with the access frequency of the logical page managed by the access frequency management table 1500. In the second embodiment, it is assumed that, if the data respectively stored in multiple logical pages is common, the function which inhibits a duplicated storage of the same data in the physical drives (hereinafter referred to as the de-duplication function) by assigning physical pages separately to the plurality of logical pages respectively, instead of assigning common physical pages to the plurality of logical pages respectively (hereinafter referred to as the de-duplication (or aggregation)) is applied to the storage apparatus 10. Generally, as for a physical page whose degree of duplication is high, the number of accesses tends to be large. Therefore, the storage apparatus 10 related to the second embodiment determines the necessity of data migration among hierarchies if one physical page is allocated to a plurality of logical pages by the de-duplication function, with reference to the degree of duplication (the number of logical pages to which the physical page is assigned).

Figure 28:
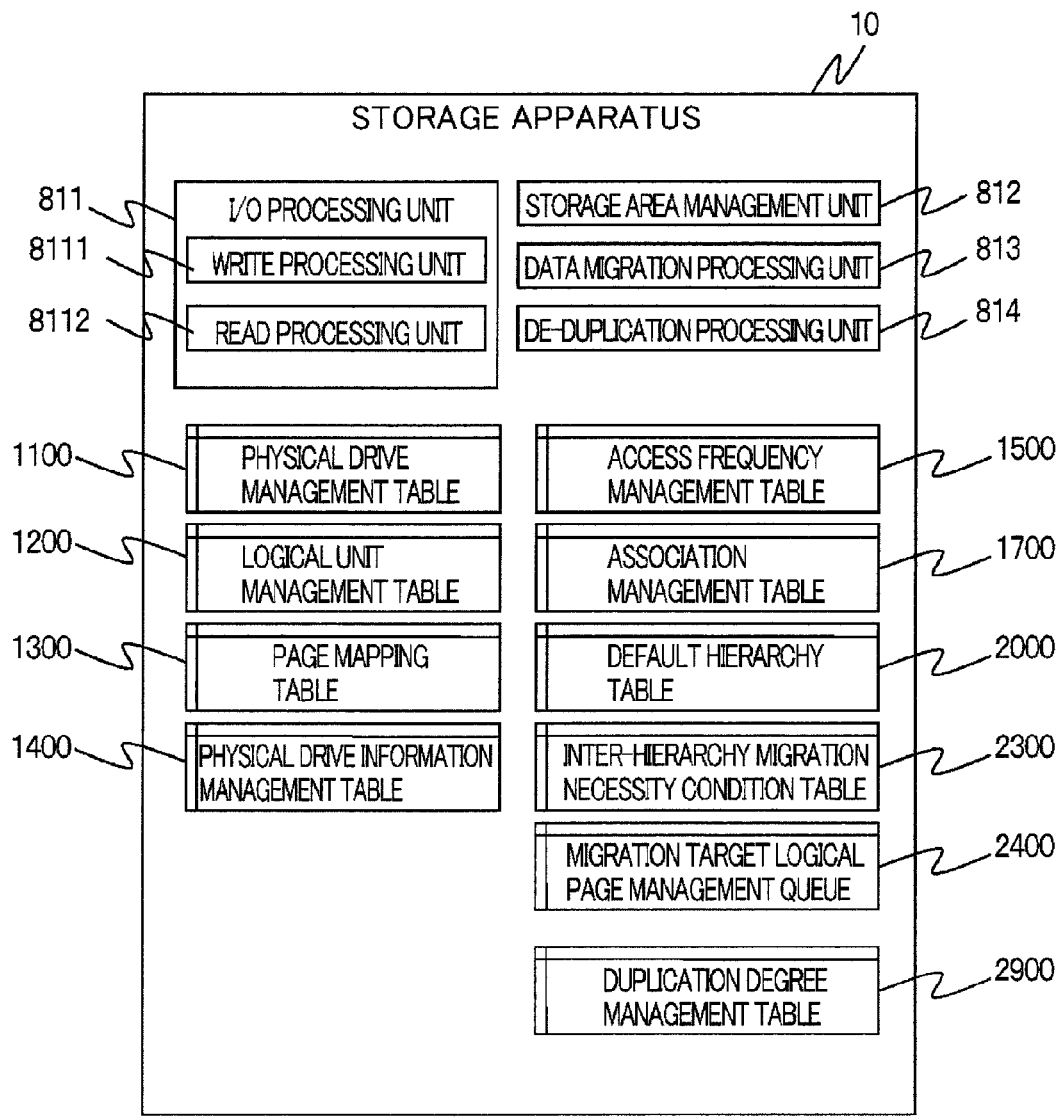
FIG. 28 shows main functions which the storage apparatus 10 has and tables which the storage apparatus 10 manages.

FIG. 28 shows the main functions which the storage apparatus 10 related to the second embodiment has and the tables which the storage apparatus 10 manages. As shown in FIG. 28, the storage apparatus 10 related to the second embodiment further includes, in addition to the functions of the storage apparatus 10 related to the first embodiment, the de-duplication processing unit 814 which implements the above-mentioned de-duplication function and the duplication degree management table 2900 where the above-mentioned degree of duplication is managed. Note that, as described later, the contents of the inter-hierarchy migration necessity condition table 2300 are different from what is shown in the first embodiment.

FIG. 29 is the duplication degree management table 2900 managed by the de-duplication processing unit 814. As shown in FIG. 29, the duplication degree management table 2900 is configured of one or more records including items of a physical page ID 2911 where a physical page ID is set, a current degree of duplication 2912 where the current degree of duplication of the physical page is set, and a previous degree of duplication 2913 where the degree of duplication of the physical page before de-duplication is performed by the latest de-duplication for the physical page is set. Note that the de-duplication processing unit 814 performs de-duplication on a schedule or timing (regular or irregular) set by the user such as the operator via the management device 7 or the maintenance device 18.

FIG. 30 is a page mapping table 1300 managed in the storage area management unit 812 in the storage apparatus 10 related to the second embodiment. The contents and roles of the page mapping table 1300 are the same as that in the first embodiment. Note that, as shown in FIG. 30, for the physical page ID 1312 of the record where "L-PAGE3" is set for the logical page ID 1311 and the physical page ID 1312 of the record where "L-PAGE5" is set for the logical page ID 1311, the same physical page ID "P-PAGE3" is set as a result of performing the de-duplication.

FIG. 31 is the inter-hierarchy migration necessity condition table 2300 which the storage apparatus 10 related to the second embodiment manages. As shown in FIG. 31, in the inter-hierarchy migration necessity condition table 2300 in the second embodiment, the conditions for migration based on the amount of change of the degree of duplication (current degree of duplication/previous degree of duplication) are set and, the condition for migration to the higher hierarchy and the condition for migration to the lower hierarchy are set for each current hierarchy of the logical page 2311.

In the storage apparatus 10 related to the second embodiment, the same processing as the processing shown in FIG. 18 is performed by the I/O processing unit 811.

Figure 32:
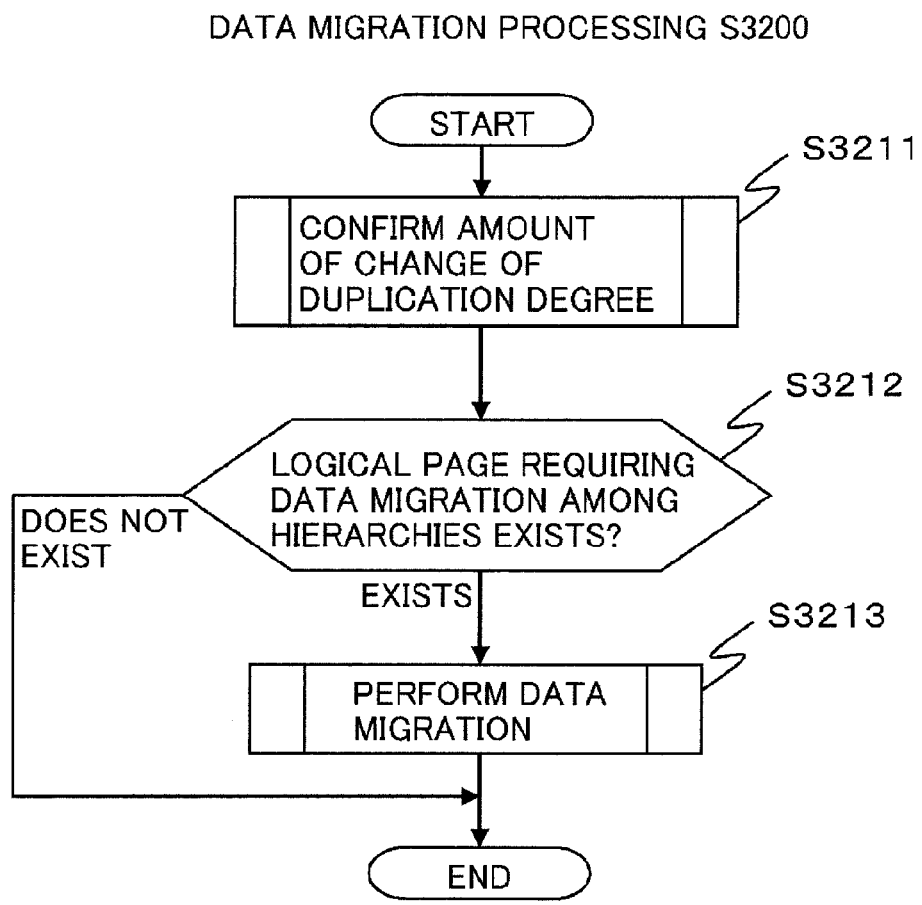
FIG. 32 is a flowchart describing data migration processing S3200.

FIG. 32 is a flowchart describing the processing performed by the data migration processing unit 813 in the storage apparatus 10 related to the second embodiment (hereinafter referred to as the data migration processing S3200). The data migration processing S3200 is performed on a schedule or timing (regular or irregular) set by the user such as the operator via the management device 7 or the maintenance device 18. Hereinafter, the data migration processing S3200 is described with reference to FIG. 32. Note that the data migration processing unit 813 performs the processing shown in FIG. 32 in collaboration with the I/O processing unit 811, the storage area management unit 812, and the de-duplication processing unit 814 as needed.

Firstly, the data migration processing unit 813, with reference to the duplication degree management table 2900, confirms the amount of change of the degree of duplication of physical pages (S3211), and determines whether or not a logical page requiring data migration among hierarchies exists (S3212). If a logical page requiring data migration among hierarchies exists (S3212: Exists), the data migration processing unit 813 determines the data migration method and implements the data migration (S3213). If no logical page requiring data migration among hierarchies exists (S3212: Does not exist), the processing ends.

Figure 33:
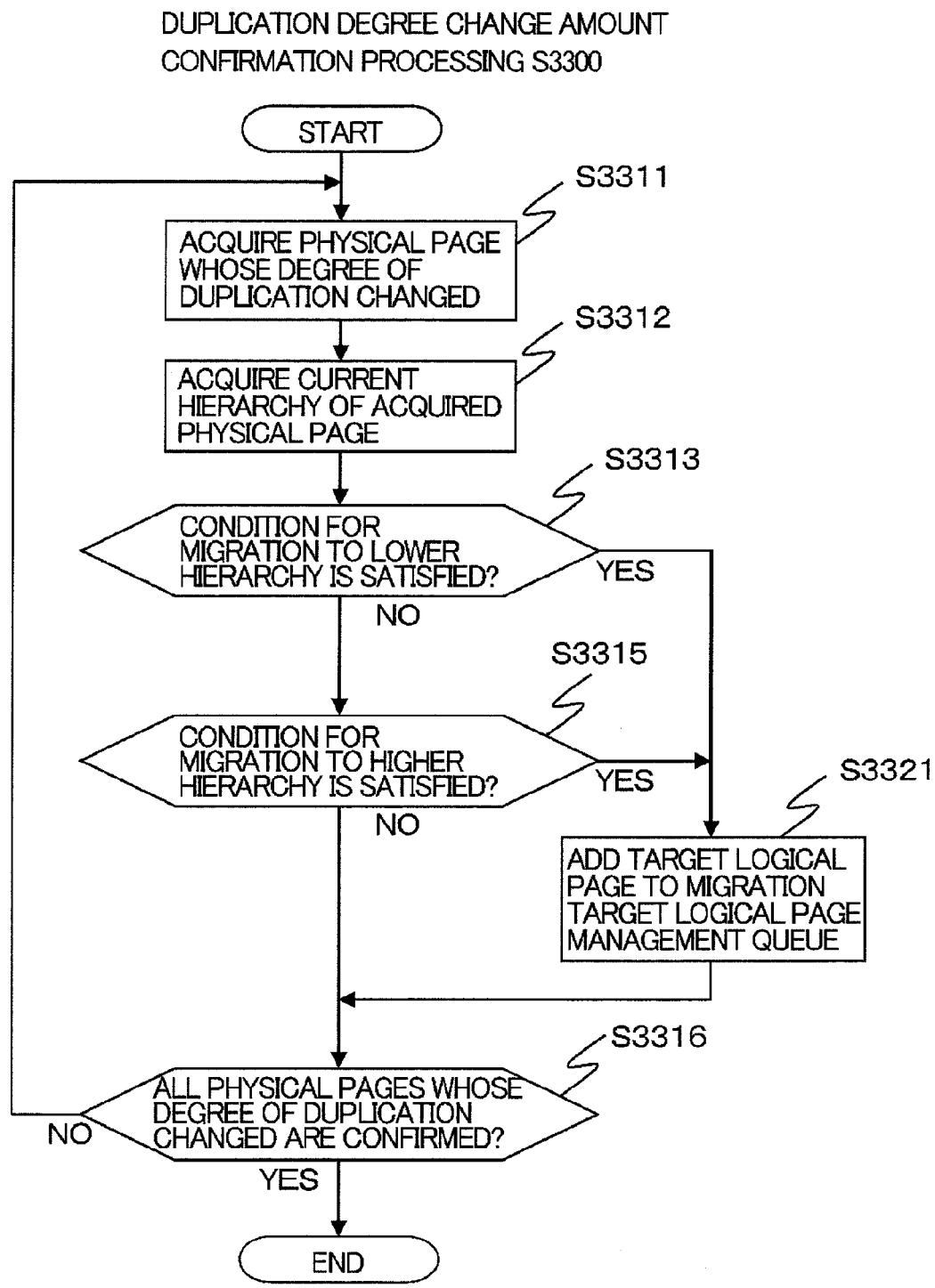
FIG. 33 is a flowchart describing duplication degree variation confirmation processing S3300.

FIG. 33 is a flowchart describing the processing at S3211 in FIG. 32 (hereinafter referred to as the duplication degree change amount confirmation processing S3300). Hereinafter, with reference to the figure, the duplication degree change amount confirmation processing S3300 is described. Note that the processing at S3213 in FIG. 32 is the same as the migration performing processing S2500 (FIG. 25 to FIG. 27) described in the first embodiment.

Firstly, the data migration processing unit 813 refers to the duplication degree management table 2900, and acquires the physical page (physical page ID) whose previous degree of duplication 2913 and the current degree of duplication 2912 are different, that is, the physical page whose degree of duplication has changed (S3311). Next, the data migration processing unit 813 compares the physical drive management table 1100 and the physical drive information management table 1400, and acquires the current hierarchy of the acquired physical page (hereinafter referred to as the target physical page) (S3312).

Next, the data migration processing unit 813 compares the current hierarchy of the target physical page acquired at S3312 with the change amount of the degree of duplication of the target physical page acquired from the duplication degree management table 2900 in the inter-hierarchy migration necessity condition table 2300, and determines whether or not the target physical page satisfies the condition for migration to the lower hierarchy 2313 (S3313). If the condition for migration to the lower hierarchy 2313 is satisfied (S3313: YES), the processing proceeds to S3321 and, if the condition 2313 is not satisfied (S3313: NO), the processing proceeds to S3315.

At S3321, the data migration processing unit 813 refers to the page mapping table 1300, specifies the logical page (logical page ID) to which the target physical page is assigned, and adds the record of the specified logical page (hereinafter referred to as the target logical page) to the migration target logical page management queue 2400 shown in FIG. 24. Then, the processing proceeds to S3316. Note that the data migration processing unit 813, when adding the above-mentioned record, acquires the migration source hierarchy 2412 and the migration destination hierarchy 2413 from the inter-hierarchy migration necessity condition table 2300, and sets the same for the record to be added.

At S3315, the data migration processing unit 813 compares the current hierarchy of the target physical page acquired at S3312 with the change amount of the degree of duplication of the target physical page acquired from the duplication degree management table 2900 in the inter-hierarchy migration necessity condition table 2300, and determines whether or not the target physical page satisfies the condition for migration to the higher hierarchy 2313. If the condition for migration to the higher hierarchy 2313 is satisfied (S3315: YES), the processing proceeds to S3321 and, if the condition 2312 is not satisfied (S3315: NO), the processing proceeds to S3316.

At S3316, the data migration processing unit 813 determines whether or not all the physical pages whose degrees of duplication are changed have been acquired (determined) from the duplication degree management table 2900. If any physical pages that are not acquired yet exist (S3316: NO), the processing returns to S3311. If all the physical pages have been acquired (S3316: YES), the processing ends.

As described above, if one physical page is allocated to a plurality of logical pages by the de-duplication function, with reference to the degree of duplication, the storage apparatus 10 related to the second embodiment determines the necessity of data migration among hierarchies and, positively performs the migration to the higher hierarchy for the logical pages to which the physical pages whose degrees of duplication are high and whose numbers of accesses are large (or are expected to increase in the future) are assigned. By this means, the degradation of access performance caused by increase of degree of duplication can be prevented (obviated). Furthermore, as the physical data migrated to the higher hierarchy is associated with the data of the migration source unless updated, the migration can be completed immediately when migrating the data from the higher hierarchy to the lower hierarchy again.

Third Embodiment

Figure 34:
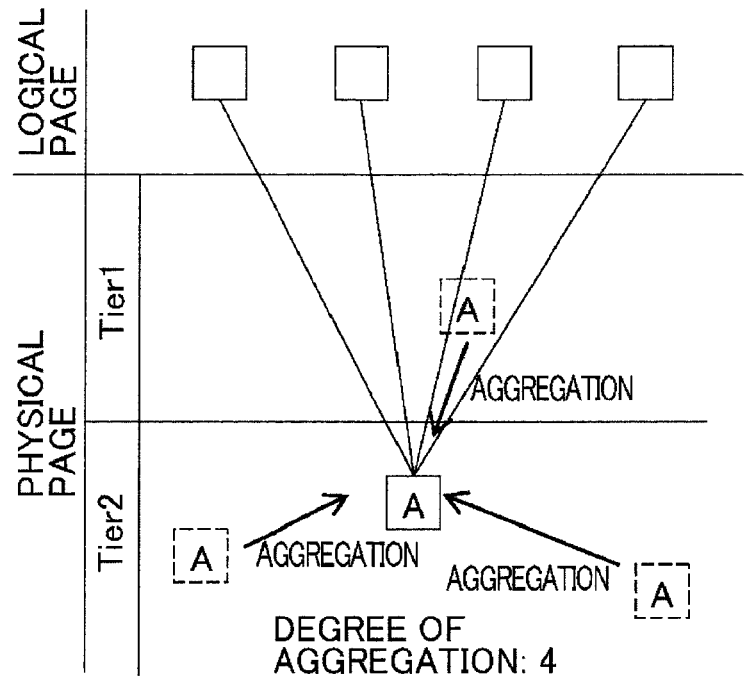
FIG. 34 is a diagram describing functions of the storage apparatus 10 according to the third embodiment.
Figure 35:
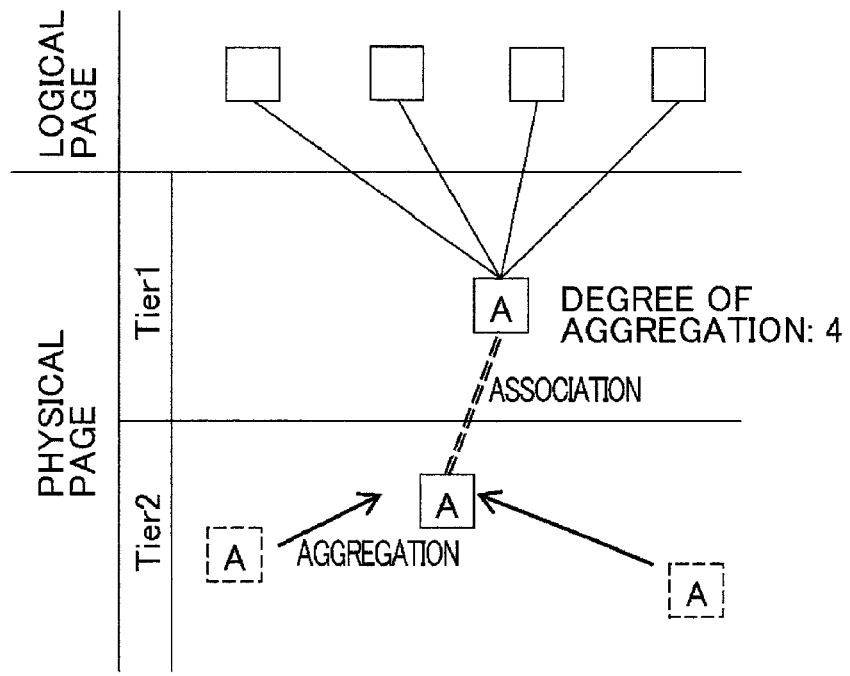
FIG. 35 is a diagram describing functions of the storage apparatus 10 according to the third embodiment.

The third embodiment, same as in the case of the second embodiment, assumes that the storage apparatus 10 includes the de-duplication function. FIG. 34 and FIG. 35 are figures describing the de-duplication function which the storage apparatus 10 related to the third embodiment has.

If duplicated data is scattered among physical pages of different hierarchies, the forms of aggregation are a case where, as shown in FIG. 34, the physical pages whose contents are identical are aggregated in the physical page existing in the lower hierarchy (the physical pages are aggregated in the physical page existing in "Tier 2" in FIG. 34) and a case where, as shown in FIG. 35, among scattered physical pages, the physical pages are aggregated in the physical page existing in the highest hierarchy (the physical pages are aggregated in the physical page existing in the "Tier 1" in the figure). The present embodiment is configured to speed up the migration where the de-duplication function, in the latter case, that is, in the case where the physical pages whose contents are identical are aggregated in the physical page existing in the highest hierarchy, leaves a part of physical pages in the lower hierarchy (leave acquired), associates the physical pages of the aggregation destination with the physical pages left in the lower hierarchy, and migrates the logical pages to the lower hierarchy again.

Figure 36:
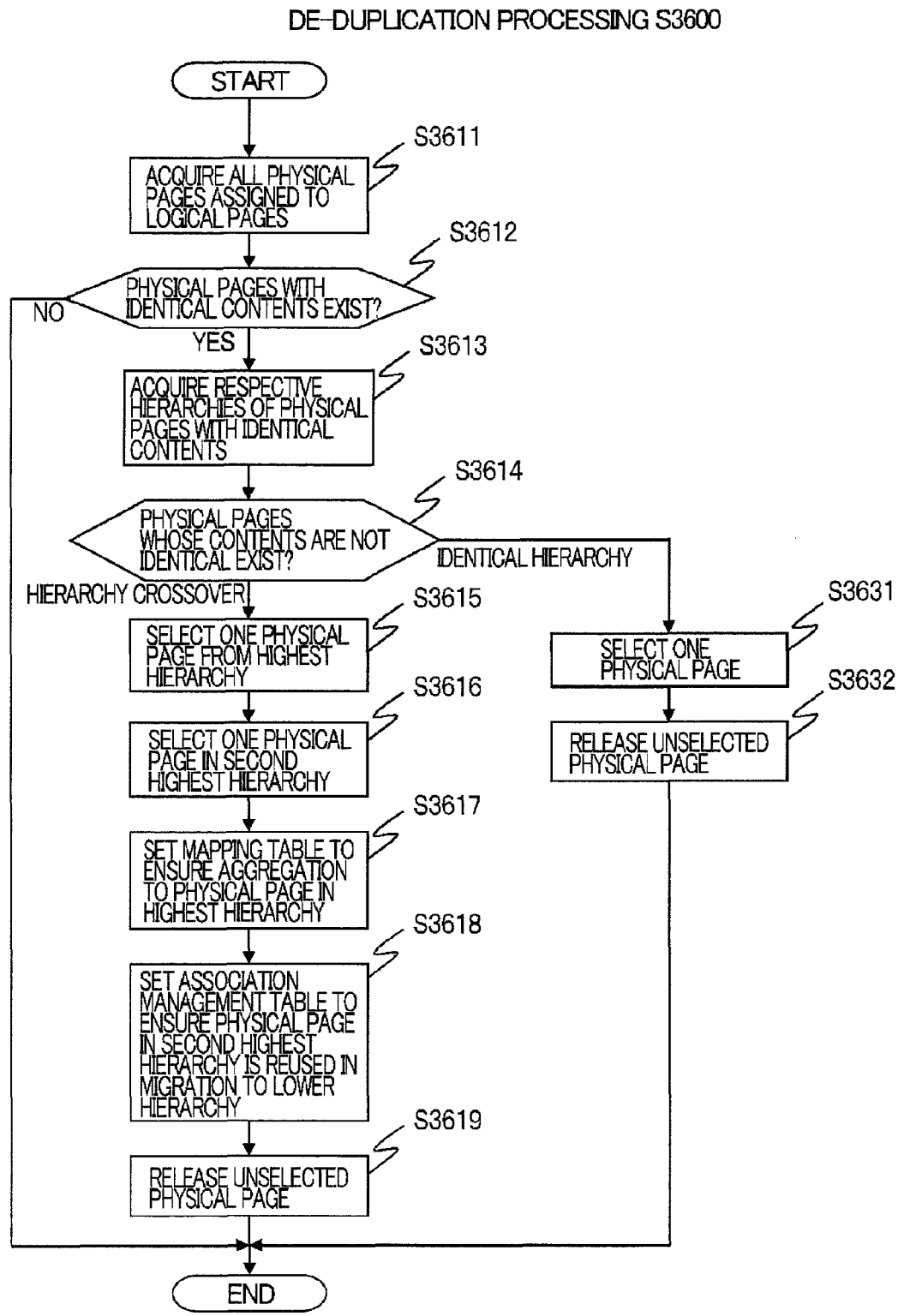
FIG. 36 is a flowchart describing de-duplication processing S3600 according to the third embodiment.

FIG. 36 is a flowchart describing the processing performed by the de-duplication processing unit 814 of the present embodiment (hereinafter referred to as the de-duplication processing S3600). Hereinafter, the de-duplication processing S3600 is described with reference to FIG. 36. Note that the de-duplication processing unit 814 performs the processing shown below in collaboration with the I/O processing unit 811, the storage area management unit 812, and the data migration processing unit 813 as needed.

Firstly, the de-duplication processing unit 814 compares the contents of all the physical pages assigned to the logical pages registered to the page mapping table 1300 (S3611) and determines whether or not any physical pages whose contents are identical exist (S3612). Then, if physical pages whose contents are identical exist (S3612: YES), the de-duplication processing unit 814 acquires the physical page IDs of those physical pages whose contents are identical and proceeds to S3613 or, if no physical pages whose contents are identical exist, returns to S3611.

Note that the processing at S3611 and S3612 is performed, for example, on a timing (regular or irregular) set by the user in advance. Furthermore, when determining at S3612 whether any physical pages whose contents are identical exist or not, it may be permitted to determine that, as mentioned above, physical pages whose contents are identical exist (S3612: YES) if at least one pair of physical pages whose contents are identical, and it may also be permitted to determine that physical pages whose contents are identical exist (S3612: YES) only if the number of pairs of physical pages whose contents are identical exceeds a threshold which is set in advance.

At S3613, the de-duplication processing unit 814 refers to the page mapping table 1300 and the physical drive information management table 1400, and acquires the current hierarchy of each of all the physical pages acquired at S3612. Then, the de-duplication processing unit 814 determines whether the hierarchies of all the physical pages acquired at S3612 are identical (hereinafter this case is referred to as an identical hierarchy) or physical pages of different hierarchies are included (hereinafter this case is referred to as a hierarchy crossover) (S3614). In a case of the hierarchy crossover (S3614: hierarchy crossover), the processing proceeds to S3615 or, in a case of the identical hierarchy (S3614: identical hierarchy), proceeds to S3631.

At S3615, the de-duplication processing unit 814 selects one physical page existing in the highest hierarchy (Tier 1) among the hierarchies of the physical pages whose contents are identical and sets it as the physical page of the aggregation destination (specific physical page).

At S3616, the de-duplication processing unit 814 selects one physical page existing in the second highest hierarchy (Tier 2) among the hierarchies of the physical pages whose contents are identical and sets it as the physical page (second physical page) to be left in the lower hierarchy (Tier 2).

At S3617, the de-duplication processing unit 814 changes the contents of the page mapping table 1300 to ensure that the other physical pages whose contents are identical are aggregated in the physical page as the aggregation destination selected at S3615. That is, the de-duplication processing unit 814 sets the contents of the page mapping table 1300 to ensure that the physical page as the aggregation destination selected at S3615 is assigned to the logical page to which all the physical pages whose contents are identical are assigned.

At S3618, the de-duplication processing unit 814 sets the contents of the association table 1700 to ensure that, if the logical page to which the physical page selected at S3615 (second physical page) is assigned is migrated to the lower hierarchy, the physical page selected at S3616 is reused. More specifically, the de-duplication processing unit 814 sets the contents of the association table 1700 to ensure that the physical page selected at S3615 (migration destination physical page ID 1711) is made to correspond to the physical page selected at S3616 (migration source physical page ID 1712). At S3619, the de-duplication processing unit 814, among the physical pages whose contents are identical in the physical drive management table 1100, for the physical page use status 1114 of the physical pages not selected at S3615 or S3616 (physical pages which are neither the aggregation destination nor the physical pages to remain), sets "Unused."

If hierarchy is determined to be identical at S3614, the processing proceeds to S3631, in which case, the de-duplication processing unit 814 selects one physical page as the aggregation destination among the physical pages whose contents are identical (S3631). Then, the de-duplication processing unit 814 sets "Unused" for the physical page use status 1114 of the physical pages in the physical drive management table 1100 other than the physical page as the aggregation destination selected at S3631 (S3632).

As described above, if physical pages whose contents are identical are scattered among different hierarchies, the storage apparatus 10 related to the third embodiment performs de-duplication to ensure that the physical pages are aggregated in the physical page existing in the highest hierarchy (specified physical page). Therefore, it is possible to prepare for the increase of the access frequency due to performing de-duplication and to prevent the degradation of the access performance from the server device 3 due to performing de-duplication. Furthermore, in the third embodiment, when aggregating to the physical page (specified physical page) to the highest hierarchy (Tier 1), the physical page (second physical page) in the lower hierarchy (Tier 2) is associated with the physical page to remain, and therefore, it is possible to pursue a speeding up of migration in a case where the logical page is re-migrated to the lower hierarchy (Tier 2).

Fourth Embodiment

The fourth embodiment, as the second embodiment and the third embodiment, assumes that the de-duplication function is applied to the storage apparatus 10. FIGS. 37 to 41 are figures describing the de-duplication function related to the fourth embodiment.

Figure 37:
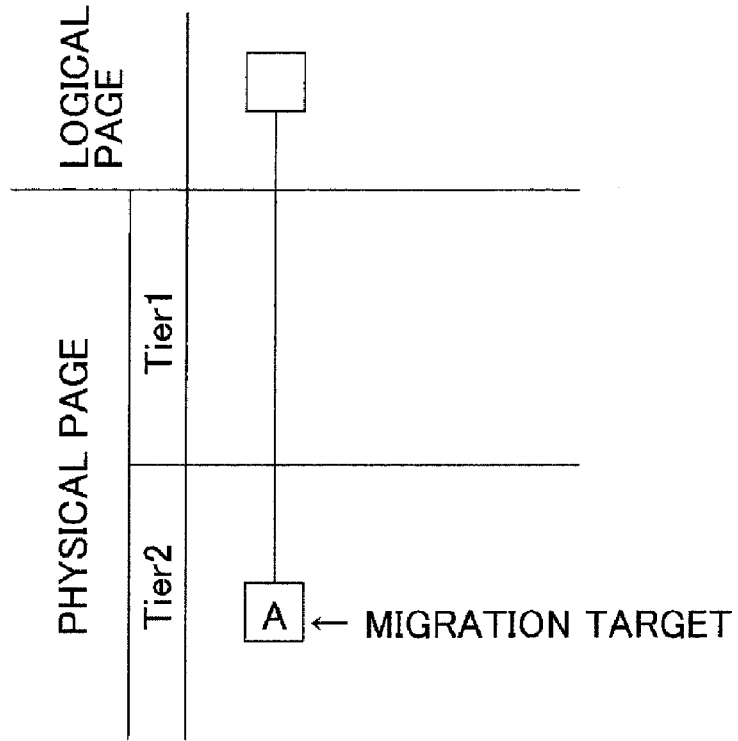
FIG. 37 is a diagram describing functions of the storage apparatus 10 according to the fourth embodiment.
Figure 38:
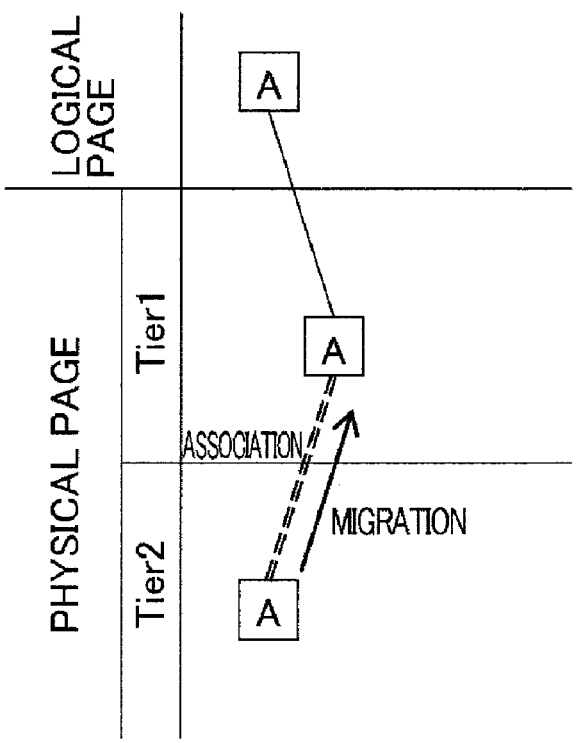
FIG. 38 is a diagram describing functions of the storage apparatus 10 according to the fourth embodiment.
Figure 39:
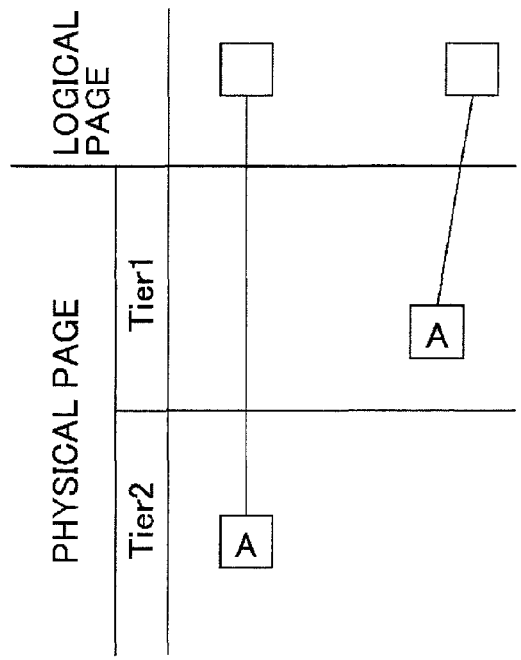
FIG. 39 is a diagram describing functions of the storage apparatus 10 according to the fourth embodiment.

In FIG. 37, when migrating a logical page, to which a physical page existing in the lower hierarchy (physical page existing in the "Tier 2" in FIG. 37) is assigned, to the higher hierarchy ("Tier 1" in FIG. 37), migration of the page as it is would proceed as shown in FIG. 38. However, as shown in FIG. 39, if physical pages whose contents are identical exist, as the aggregation is possible by the de-duplication function, performing de-duplication simultaneously with migration is efficient in such case.

Figure 40:
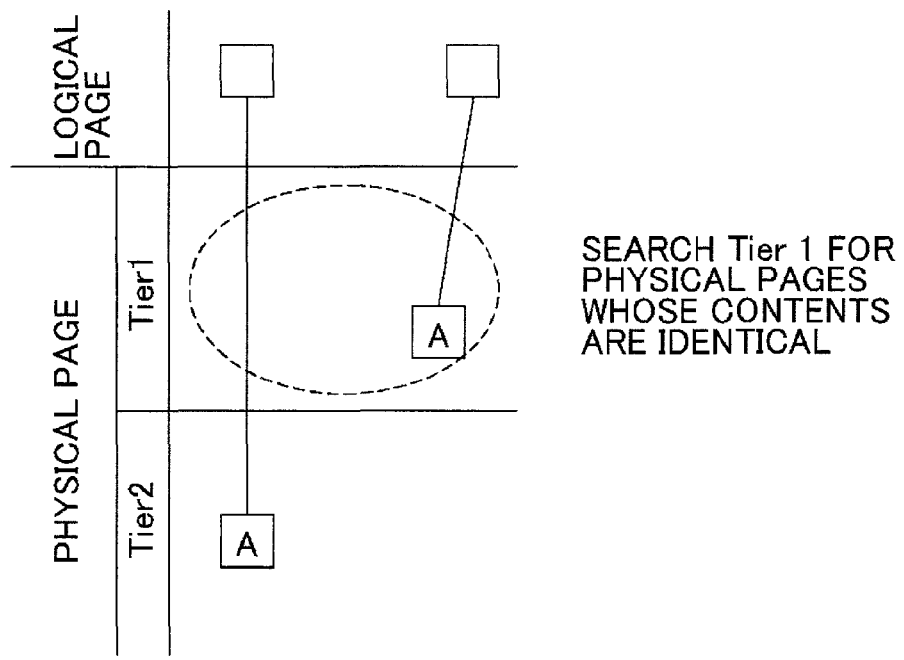
FIG. 40 is a diagram describing functions of the storage apparatus 10 according to the fourth embodiment.
Figure 41:
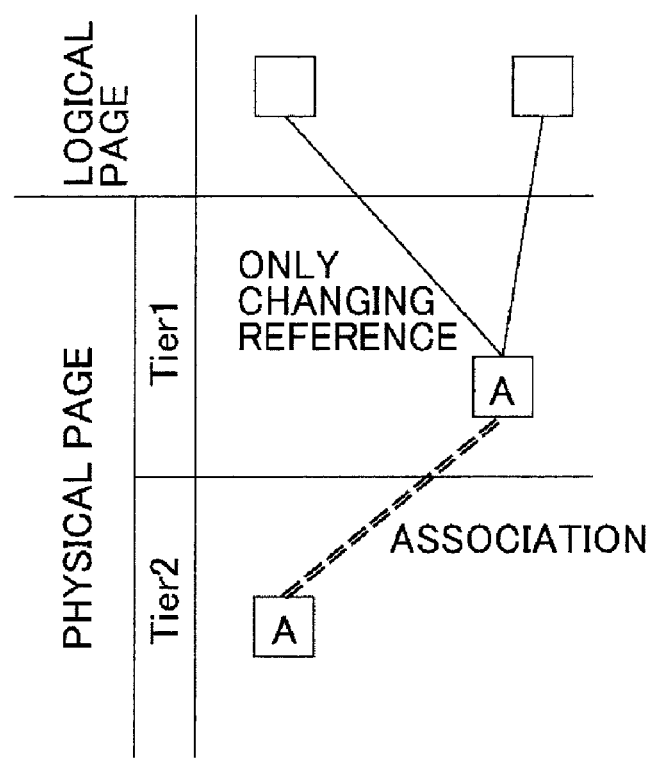
FIG. 41 is a diagram describing functions of the storage apparatus 10 according to the fourth embodiment.

Therefore, as shown in FIG. 40, when migrating logical pages, in the fourth embodiment, checks whether or not any physical pages whose contents are identical to the contents of the physical pages currently assigned to the migration target logical pages exist in the higher hierarchy as the migration destination and, as shown in FIG. 41, if any physical pages whose contents are identical exist, does not duplicate the physical pages and only changes the assignment of the physical pages to the logical pages (page mapping table 1300).

The function of the storage apparatus 10 in the fourth embodiment has a configuration common to that shown in FIG. 28. The processing performed by the storage apparatus 10 in the fourth embodiment is, though basically common to the first embodiment, differs from the first embodiment in that, in the upward migration processing described in the first embodiment (S2521 in FIG. 25, S2600 in FIG. 26), when physical pages whose contents are identical to the contents of the physical pages currently assigned to the migration target logical pages exist in the higher hierarchy as the migration destination, the data stored in the physical pages is not duplicated.

Figure 42:
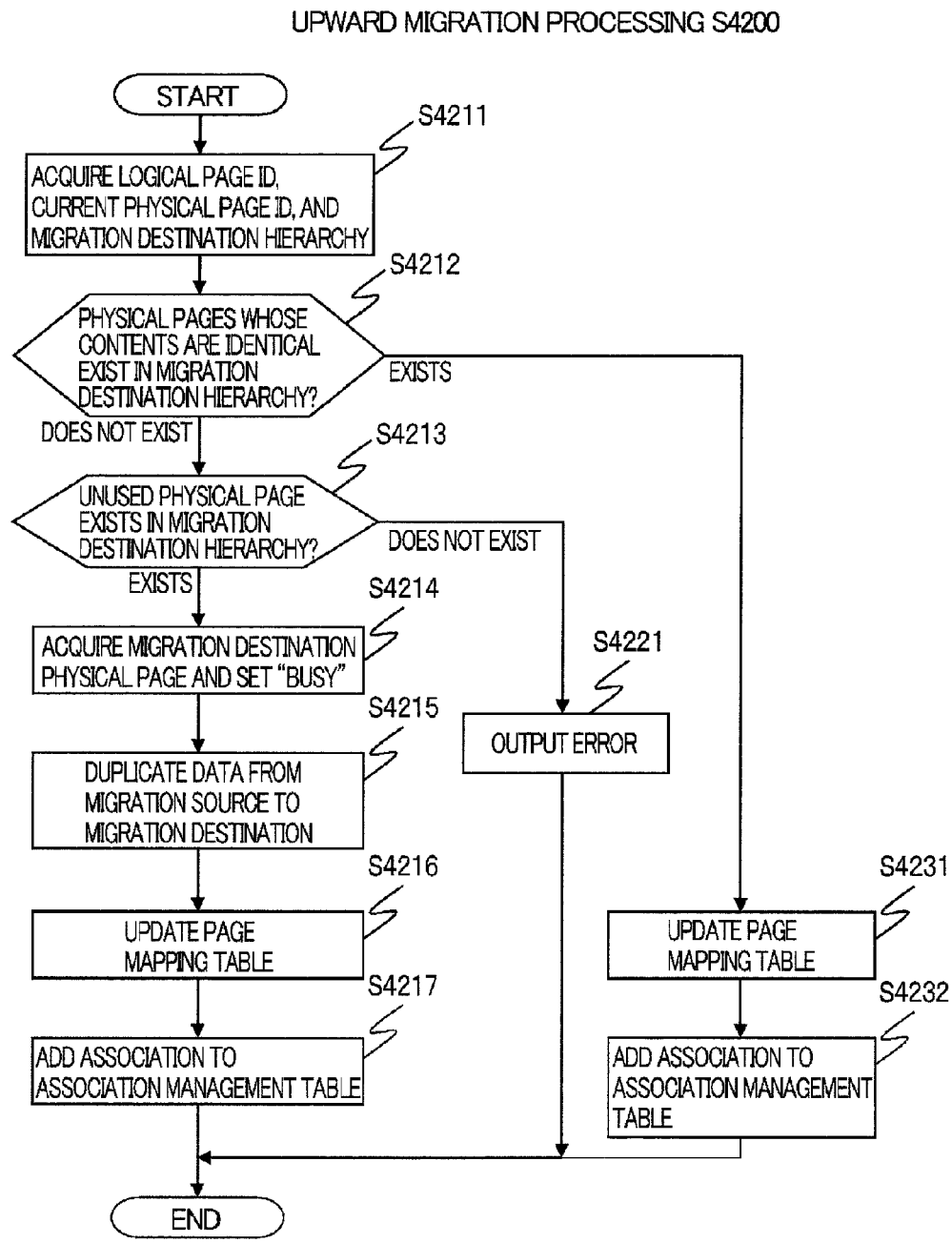
FIG. 42 is a flowchart describing upward migration processing S4200 according to the fourth embodiment.

FIG. 42 is a flowchart describing the upward migration processing performed in the storage apparatus 10 in the fourth embodiment (the processing performed as S2521 in FIG. 25. Hereinafter referred to as the upward migration processing S4200). Hereinafter, the processing will be described with reference to FIG. 42. Note that the data migration processing unit 813 performs the following processing in collaboration with the I/O processing unit 811, the storage area management unit 812, and the de-duplication processing unit 814 as needed.

Firstly, the data migration processing unit 813 refers to the migration target logical page management queue 2400 and the page mapping table 1300, and acquires the logical page ID of the target logical page, the physical page ID of the physical page currently assigned to the logical page ID (migration source physical page), and the migration destination hierarchy (S4211).

Next, the data migration processing unit 813 refers to the physical drive management table 1100 and the physical drive information management table 1400, specifies the physical page existing in the migration destination hierarchy, and checks whether or not any physical pages whose contents are identical to the contents of the physical pages in the migration source exist in the migration destination hierarchy (S4212). If a physical page whose contents are identical exists in the migration destination hierarchy (S4212: Exists), the processing proceeds to S4231 and, if no physical page whose contents are identical exists in the migration destination hierarchy (S4212: Does not exist), proceeds to S4213.

At S4231, the data migration processing unit 813 changes the contents of the physical page ID 1312 corresponding to the logical page ID 1311 of the target logical page in the page mapping table 1300 to the physical page ID of the physical page whose contents are identical found at S4212. Furthermore, the data migration processing unit 813 registers the association between the migration destination physical page and the migration source physical page to the association management table 1700 (S4232).

At S4213, the data migration processing unit 813 refers to the physical drive management table 1100 and the physical drive information management table 1400, and checks whether or not an unused physical page exists in the higher hierarchy as the migration destination. If no unused physical page exists (S4213: Does not exist), the data migration processing unit 813 outputs an error to the management device 7 or the maintenance device 18 (S4221).

Meanwhile, if an unused physical page exists (S4213: Exists), the data migration processing unit 813 acquires the unused physical page in the higher hierarchy, and sets "Busy" for the physical page use status 1114 of the acquired physical page in the physical drive management table 1100 (S4214).

Next, the data migration processing unit 813 duplicates the data stored in the migration source physical page to the migration destination physical page (S4215).

Next, the data migration processing unit 813 changes the contents of the physical page ID 1312 corresponding to the logical page ID 1311 of the target logical page in the page mapping table 1300 to the physical page ID of the migration destination physical page (S4216). Note that, if the de-duplication function which is described in the second embodiment is performed in the storage apparatus 10, for all the logical pages to which the migration source physical page is assigned, the data migration processing unit 813 reassigns migration destination physical pages (changes the contents of the physical page ID 1312 corresponding to the relevant logical page (logical page ID 1311) to the physical page ID of the migration destination physical page). Then, the data migration processing unit 813 registers the association between the migration destination physical page and the migration source physical page to the association management table 1700 (S4217).

As described above, the storage apparatus 10 related to the fourth embodiment, when migrating logical pages, if physical pages whose contents are identical to the contents of the physical page currently assigned to the migration target logical pages exist in the higher hierarchy of the migration destination, does not duplicate the physical pages from the lower hierarchy to the higher hierarchy, and only changes the assignment of the physical pages to the logical pages (page mapping table 1300). Therefore, de-duplication can be performed simultaneously with the migration, enabling to achieve both the effect of speeding up migration and the effect of improving the efficiency of de-duplication by omitting ex-post de-duplication.

Fifth Embodiment

Figure 43:
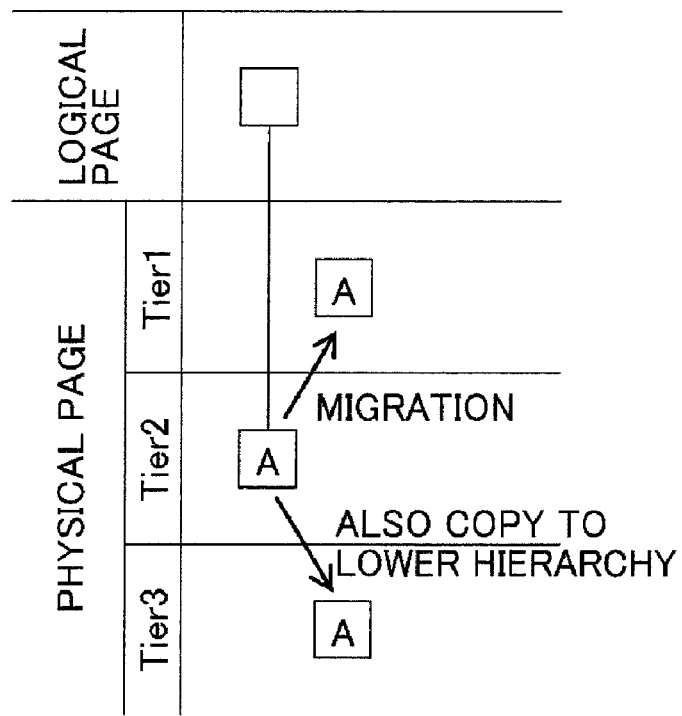
FIG. 43 is a diagram describing functions of the storage apparatus 10 according to the fifth embodiment.
Figure 44:
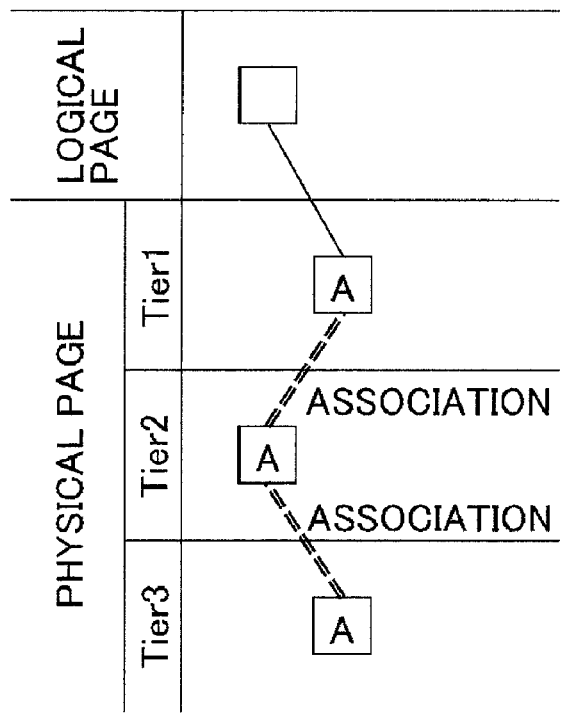
FIG. 44 is a diagram describing functions of the storage apparatus 10 according to the fifth embodiment.

The fifth embodiment assumes to have the configuration of the first embodiment. FIG. 43 and FIG. 44 are figures describing the function of the storage apparatus 10 related to the fifth embodiment. The fifth embodiment, when migrating logical pages to the higher hierarchy (migration from the Tier 2 to the Tier 1), if a physical page (third physical page) of a hierarchy (Tier 3) lower than the hierarchy (Tier 2) of the migration source physical page (second physical page) exists (FIG. 43), in preparation for the case where a logical page is migrated to the lower hierarchy (Tier 3) in the future, duplicates the migration source physical page (second physical page) to the lower hierarchy (Tier 3) and associates the same (FIG. 44).

Figure 45:
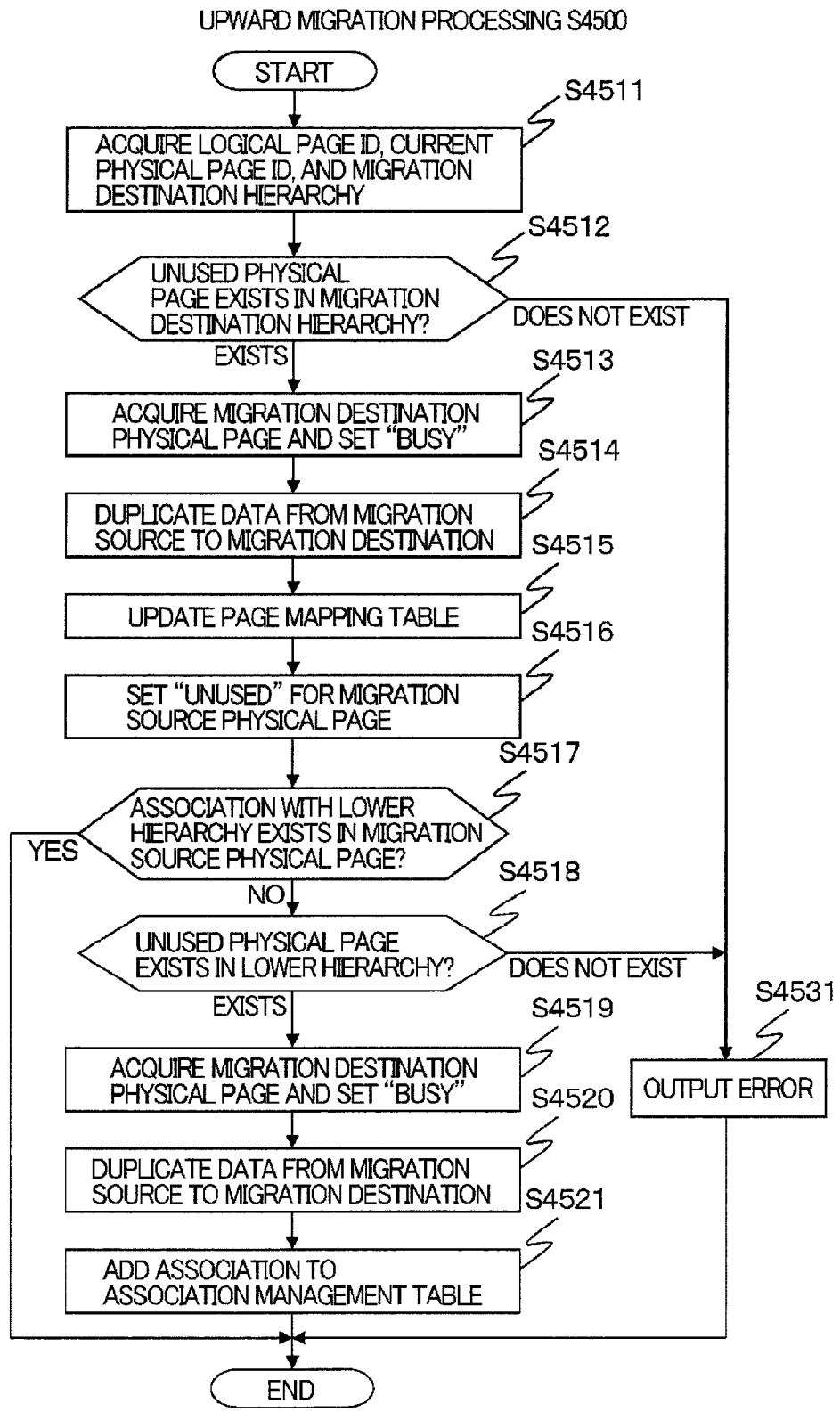
FIG. 45 is a flowchart describing upward migration processing S4500 according to the fifth embodiment.

FIG. 45 is a flowchart describing the processing performed as S2521 in FIG. 25 performed in the storage apparatus 10 in the fifth embodiment (hereinafter referred to as the upward migration processing S4500). Hereinafter, the processing is described with reference to FIG. 45. Note that the data migration processing unit 813 performs the processing below in collaboration with the I/O processing unit 811, the storage area management unit 812, and the de-duplication processing unit 814 as needed.

Firstly, the data migration processing unit 813 refers to the migration target logical page management queue 2400 and the page mapping table 1300, and acquires the logical page ID of the logical page as the migration target (hereinafter referred to as the target logical page), the physical page ID of the physical page currently assigned to the logical page ID (hereinafter referred to as the migration source physical page (second physical page)), and the migration destination hierarchy (Tier 2) (S4511).

Next, the data migration processing unit 813 refers to the physical drive management table 1100 and the physical drive information management table 1400, and checks whether any unused physical pages exist in the migration destination higher hierarchy (Tier 1) or not (S4512). If no unused physical page exists (S4512: Does not exist), the data migration processing unit 813 outputs an error to the management device 7 or the maintenance device 18 (S4531), and the processing ends.

Meanwhile, if an unused physical page exists (S4512: Exists), the data migration processing unit 813 acquires one unused physical page in the higher hierarchy, and sets "Busy" for the physical page use status 1114 of the acquired physical page in the physical drive management table 1100 (S4513). Then, the data migration processing unit 813 duplicates the data stored in the migration source physical page (second physical page) to the physical page (first physical page) of the acquired higher hierarchy (S4514).

Next, the data migration processing unit 813 changes the contents of the physical page ID 1312 corresponding to the logical page ID 1311 of the target logical page in the page mapping table 1300 to the physical page ID of the migration destination physical page (first physical page) (S4515). Furthermore, the data migration processing unit 813 sets "Unused" for the physical page use status 1114 of the migration source physical page in the physical drive management table 1100 (S4516).

Next, the data migration processing unit 813 determines whether or not the migration source physical page (second physical page) is associated with the physical page (third physical page) in the lower hierarchy (Tier 3) (S4517). If the migration source physical page (second physical page) is already associated with the physical page (third physical page) in the lower hierarchy (Tier 3) (S4517: YES), the processing ends and, if no association is performed (S4517: NO), the processing proceeds to S4518.

At S4518, the data migration processing unit 813 refers to the physical drive management table 1100 and the physical drive information management table 1400, and checks whether or not any unused physical pages exist in the lower hierarchy (Tier 3). If no unused physical page exists in the lower hierarchy (Tier 3) (S4518: Does not exist), the data migration processing unit 813 outputs an error to the management device 7 or the maintenance device 18 (S4531), and the processing ends.

If an unused physical page exists (S4518: Exists), the data migration processing unit 813 acquires an unused physical page (third physical page) in the lower hierarchy (Tier 3), and sets "Busy" for the physical page use status 1114 of the acquired physical page in the physical drive management table 1100 (S4519). Then, the data migration processing unit 813 duplicates the data stored in the migration source physical page (second physical page) to the acquired physical page (third physical page) in the lower hierarchy (Tier 3) (S4520). Furthermore, the data migration processing unit 813 registers the association between the migration destination physical page (the physical page (first physical page) in the higher hierarchy (Tier 1)) and, if duplication to the lower hierarchy (Tier 3) is performed, further registers the physical page (third physical page) in the lower hierarchy (Tier 3)) and the migration source physical page (second physical page) (S4521).

As described above, the storage apparatus 10 related to the fifth embodiment, when migrating logical pages to the higher hierarchy, if a hierarchy (Tier 3) lower than the hierarchy (Tier 2) of the migration source physical page (second physical page) exists, duplicates the migration source physical page (Tier 2) to the lower hierarchy (Tier 3), and associates the duplicated physical page (third physical page) with the migration source physical page (second physical page). By this means, when a logical page is migrated to the lower hierarchy (Tier 3) in the future, the migration can be completed without delay.

Sixth Embodiment

Figure 46:
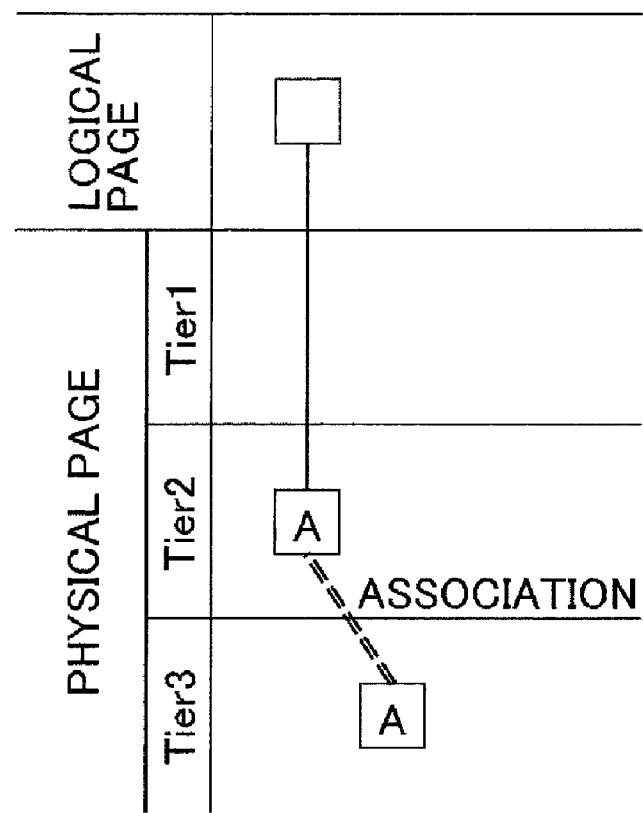
FIG. 46 is a diagram describing functions of the storage apparatus 10 according to the sixth embodiment.

The sixth embodiment assumes to have the configuration of the first embodiment. FIG. 46 is a figure describing the function of the storage apparatus 10 related to the sixth embodiment. As shown in FIG. 46, the sixth embodiment, if a hierarchy (Tier 3) lower than the current hierarchy (Tier 2) of the logical page exists but the physical page (second physical page) currently assigned to the logical page is not associated with the physical page (third physical page) of the lower hierarchy (Tier 3), in preparation for a case where a logical page is migrated to the lower hierarchy (Tier 3) in the future, duplicates the contents of the physical page (second physical page) currently assigned to the logical page, to the physical page (third physical page) in the lower hierarchy, and ensures that the physical page (second physical page) currently assigned to the logical page and the physical page (third physical page) of the lower hierarchy (Tier 3) in the duplication destination are associated in advance.

Figure 47:
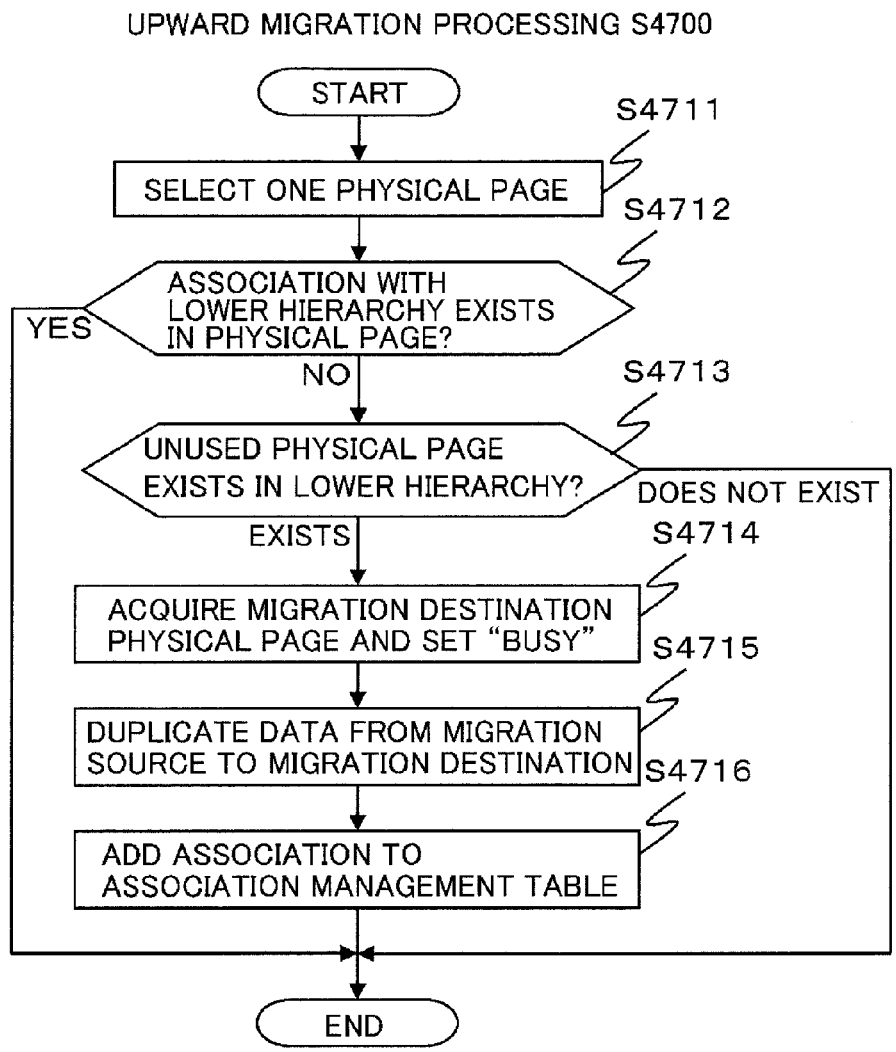
FIG. 47 is a flowchart describing upward migration processing S4700 according to the sixth embodiment.

FIG. 47 is a flowchart describing the processing performed as S2521 in FIG. 25 performed in the storage apparatus 10 in the sixth embodiment (hereinafter referred to as the upward migration processing S4700). Hereinafter, the processing is described with reference to FIG. 47. Note that the data migration processing unit 813 performs the processing below in collaboration with the I/O processing unit 811, the storage area management unit 812, and the de-duplication processing unit 814 as needed.

The data migration processing unit 813 selects one physical page where "Busy" is set for the physical page use status 1114 from the physical drive management table 1100 (S4711).

Next, the data migration processing unit 813 refers to the physical drive information management table 1400 and the association management table 1700 and determines whether or not the physical page selected at S4711 (hereinafter referred to as the target physical page) is associated with the physical page (third physical page) in the lower hierarchy (Tier 3) (S4712). If the physical page (third physical page) in the lower hierarchy (Tier 3) is already associated with the target physical page (S4712: YES), the processing ends. If the physical page (third physical page) in the lower hierarchy (Tier 3) is not associated (S4712: NO), the processing proceeds to S4713.

At S4713, the data migration processing unit 813 refers to the physical drive management table 1100 and the physical drive information management table 1400, and determines whether an unused physical page exists in the lower hierarchy (Tier 3) or not. If no unused physical page exists in the lower hierarchy (Tier 3) (S4713: Does not exist), the processing ends.

Meanwhile, if an unused physical page exists (S4713: Exists), the data migration processing unit 813 acquires the unused physical page in the lower hierarchy, and sets "Busy" for the physical page use status 1114 of the acquired physical page in the physical drive management table 1100 (S4714).

Next, the data migration processing unit 813 duplicates the data stored in the migration source physical page (second physical page) to the physical page (third physical page) in the lower hierarchy (Tier 3) acquired at S4714 (S4715). Then, the data migration processing unit 813 registers the association between the target physical page (second physical page) and the physical page (third physical page) in the lower hierarchy in the association management table 1700 (S4716).

As described above, in the sixth embodiment, if a hierarchy (Tier 3) lower than the current hierarchy (Tier 2) of the physical page (second physical page) exists but the relevant physical page (second physical page) is not associated with the physical page (third physical page) of the lower hierarchy (Tier 3), duplicates the contents of the physical page (second physical page) to the physical page (third physical page) in the lower hierarchy (Tier 3), and ensures that the above are associated in advance. By this means, if a logical page is migrated to the lower hierarchy (Tier 3) in the future, the migration can be completed without delay.

Though the present embodiment has been described as above, the above-mentioned embodiment is intended for ease of understanding this invention and by no means limited to any particular constructions herein disclosed. The present invention also includes any changes, modifications or equivalents within the spirit and scope thereof.

The invention claimed is:

1. A storage apparatus that performs writing and reading of data to a plurality of physical drives classified into hierarchies, in accordance with data I/O requests sent from an external device, provides to the external device a storage area of any of the plurality of physical drives in a unit of a logical unit that is a logical storage area, configures the logical unit by assigning a physical page that is a unit of a storage area of any of the plurality of physical drives, to a logical page that is a unit of a storage area of the logical unit, performs a first migration of the logical page by reassigning a first physical page to the logical page, the first physical page being the physical page provided by any of the plurality of physical drives of a first hierarchy that is the hierarchy higher than a second hierarchy that is the hierarchy of any of the plurality of physical drives providing a second physical page that is the physical page currently assigned to the logical page, and making contents of the second physical page identical with contents of the first physical page, associates the second physical page with the first physical page and manages the two, performs a second migration of the logical page by reassigning the second physical page to the logical page, when the first physical page is associated to the second physical page, at a time the second migration is performed by reassigning the physical page provided by any of the plurality of physical drives of the second hierarchy, to the logical page to which the first physical page is assigned, a channel control unit that communicates with the external device; a drive control unit that writes data to any of the plurality of physical drives or reads data from any of the plurality of physical drives;

a cache memory that stores therein data to be written to any of the plurality of physical drives and data read out from any of the plurality of physical drives; and a processor control unit that transfers data between at least any one of the channel control unit, the drive control unit and the cache memory.

2. The storage apparatus according to claim 1, wherein the association is cancelled when, after the first migration, a content of the first physical page is changed before the second migration.

3. The storage apparatus according to claim 1, wherein the hierarchy is classified with reference to at least any one of a type, a configuration and a performance of any of the plurality of physical drives.

4. The storage apparatus according to claim 1, wherein access frequency is managed for each of the logical page, and the first migration or the second migration is started for the logical page when the access frequency of the logical page satisfies a predetermined condition.

5. The storage apparatus according to claim 1, wherein storage areas of the physical page is configured using a storage area of a RAID group configured by any of the plurality of the physical drives.

6. A storage apparatus that performs writing and reading of data to a plurality of physical drives classified into hierarchies, in accordance with data I/O requests sent from an external device, provides to the external device a storage area of any of the plurality of physical drives in a unit of a logical unit that is a logical storage area, configures the logical unit by assigning a physical page that is a unit of a storage area of any of the plurality of physical drives, to a logical page that is a unit of a storage area of the logical unit, performs a first migration of the logical page by reassigning a first physical page to the logical page, the first physical page being the physical page provided by any of the plurality of physical drives of a first hierarchy that is the hierarchy higher than a second hierarchy that is the hierarchy of any of the plurality of physical drives providing a second physical page that is the physical page currently assigned to the logical page, and making contents of the second physical page identical with contents of the first physical page, associates the second physical page with the first physical page and manages the two, performs a second migration of the logical page by reassigning the second physical page to the logical page, when the first physical page is associated to the second physical page, at a time the second migration is performed by reassigning the physical page provided by any of the plurality of physical drives of the second hierarchy, to the logical page to which the first physical page is assigned, wherein the association is cancelled when, after the first migration, a content of the first physical page is changed before the second migration, the hierarchy is classified with reference to at least any one of a type, a configuration and a performance of any of the plurality of physical drives, access frequency is managed for each of the logical page, and the first migration or the second migration is started for the logical page when the access frequency of the logical page satisfies a predetermined condition, storage areas of the physical page is configured using a storage area of a RAID group configured by any of a plurality of physical drives, the storage apparatus includes a channel control unit that communicates with the external device, a drive control unit that writes data to any of the plurality of physical drives or reads data from any of the plurality of physical drives, a cache memory that stores therein data to be written to any of the plurality of physical drives and data read out from any of the plurality of physical drives, and a processor control unit that transfers data between at least any one of the channel control unit, the drive control unit and the cache memory, the storage apparatus performs de-duplication of the physical page by assigning to a plurality of the logical pages a specific physical page of the physical pages whose contents are identical as well as releasing the physical pages, besides the specific physical page, whose contents are identical, when contents of the physical page assigned to each of the logical pages are identical, manages a history of a duplication degree that is a number of the logical pages to which the specific physical page is assigned, and starts the first migration or the second migration of the logical page according to a variation of the duplication degree, the storage apparatus performs the de-duplication by setting the physical page in a highest of the hierarchies as the specific physical page when the physical page whose contents are identical includes the ones belonging to the different hierarchies, performs the association by setting the specific physical page as the first physical page and setting one of the physical pages of a lower one of the hierarchies than the specific physical page as the second physical page, performs the second migration by reassigning the second physical page to the logical page when, at a time of performing the second migration, the first physical page is associated to the second physical page, the storage apparatus, when a third hierarchy that is the hierarchy lower than the second hierarchy exists at a time of the first migration, generates in the third hierarchy, a third physical page that is the physical page whose contents are identical to the second physical page as well as associates the second physical page and the third physical page and manages the two, and, at a time a third migration is performed by reassigning the physical page provided by the physical drive of the third hierarchy for the logical page to which the second physical page is assigned, performs the third migration by reassigning the third physical page to the logical page when the third physical page is associated to the second physical page the storage apparatus, when a third hierarchy that is the hierarchy lower than the second hierarchy exists, generates in the third hierarchy, a third physical page that is the physical page whose contents are identical to contents of the second physical page, as well as associates the second physical page and the third physical page and manages the two, and, at a time a third migration is performed by reassigning the physical page provided by any of the plurality of physical drives of the third hierarchy for the logical page to which the second physical page is assigned, performs the third migration by reassigning again the third physical page to the logical page, when the third physical page is associated to the second physical page.

7. A storage apparatus that performs writing and reading of data to a plurality of physical drives classified into hierarchies, in accordance with data I/O requests sent from an external device, provides to the external device a storage area of any of the plurality of physical drives in a unit of a logical unit that is a logical storage area, configures the logical unit by assigning a physical page that is a unit of a storage area of any of the plurality of physical drives, to a logical page that is a unit of a storage area of the logical unit, performs a first migration of the logical page by reassigning a first physical page to the logical page, the first physical page being the physical page provided by any of the plurality of physical drives of a first hierarchy that is the hierarchy higher than a second hierarchy that is the hierarchy of any of the plurality of physical drives providing a second physical page that is the physical page currently assigned to the logical page, and making contents of the second physical page identical with contents of the first physical page, associates the second physical page with the first physical page and manages the two, performs a second migration of the logical page by reassigning the second physical page to the logical page, when the first physical page is associated to the second physical page, at a time the second migration is performed by reassigning the physical page provided by any of the plurality of physical drives of the second hierarchy, to the logical page to which the first physical page is assigned, wherein the storage apparatus performs de-duplication of the physical page by assigning to a plurality of the logical pages a specific physical page of the physical pages whose contents are identical as well as releasing the physical pages, besides the specific physical page, whose contents are identical, when contents of the physical page assigned to each of the logical pages are identical, manages a history of a duplication degree that is a number of the logical pages to which the specific physical page is assigned, and starts the first migration or the second migration of the logical page according to a variation of the duplication degree.

8. A storage apparatus that performs writing and reading of data to a plurality of physical drives classified into hierarchies, in accordance with data I/O requests sent from an external device,
provides to the external device a storage area of any of the plurality of physical drives in a unit of a logical unit that is a logical storage area,
configures the logical unit by assigning a physical page that is a unit of a storage area of any of the plurality of physical drives, to a logical page that is a unit of a storage area of the logical unit,
performs a first migration of the logical page by reassigning a first physical page to the logical page, the first physical page being the physical page provided by any of the plurality of physical drives of a first hierarchy that is the hierarchy higher than a second hierarchy that is the hierarchy of any of the plurality of physical drives providing a second physical page that is the physical page currently assigned to the logical page, and making contents of the second physical page identical with contents of the first physical page,
associates the second physical page with the first physical page and manages the two,
performs a second migration of the logical page by reassigning the second physical page to the logical page, when the first physical page is associated to the second physical page, at a time the second migration is performed by reassigning the physical page provided by any of the plurality of physical drives of the second hierarchy, to the logical page to which the first physical page is assigned,
wherein the storage apparatus performs de-duplication of the physical page by assigning to a plurality of the logical pages a specific physical page of the physical pages whose contents are identical as well as releasing the physical pages, besides the specific physical page, whose contents are identical, when contents of the physical page assigned to each of the logical pages are identical, performs the de-duplication by setting the physical page in a highest of the hierarchies as the specific physical page when the physical pages whose contents are identical include the ones belonging to the different hierarchies, performs the association by setting the specific physical page as the first physical page and setting one of the physical pages of a lower one of the hierarchies than the specific physical page as the second physical page, and performs the second migration by reassigning the second physical page to the logical page when, at a time of performing the second migration, the first physical page is associated to the second physical page.

9. A storage apparatus that performs writing and reading of data to a plurality of physical drives classified into hierarchies, in accordance with data I/O requests sent from an external device,
provides to the external device a storage area of any of the plurality of physical drives in a unit of a logical unit that is a logical storage area,
configures the logical unit by assigning a physical page that is a unit of a storage area of any of the plurality of physical drives, to a logical page that is a unit of a storage area of the logical unit,
performs a first migration of the logical page by reassigning a first physical page to the logical page, the first physical page being the physical page provided by any of the plurality of physical drives of a first hierarchy that is the hierarchy higher than a second hierarchy that is the hierarchy of any of the plurality of physical drives providing a second physical page that is the physical page currently assigned to the logical page, and making contents of the second physical page identical with contents of the first physical page,
associates the second physical page with the first physical page and manages the two,
performs a second migration of the logical page by reassigning the second physical page to the logical page, when the first physical page is associated to the second physical page, at a time the second migration is performed by reassigning the physical page provided by any of the plurality of physical drives of the second hierarchy, to the logical page to which the first physical page is assigned,
wherein the storage apparatus, when a third hierarchy that is the hierarchy lower than the second hierarchy exists at a time of the first migration, generates in the third hierarchy, a third physical page that is the physical page whose contents are identical to the second physical page as well as associates the second physical page and the third physical page and manages the two, and, at a time a third migration is performed by reassigning the physical page provided by any of the plurality of physical drives of the third hierarchy for the logical page to which the second physical page is assigned, performs the third migration by reassigning the third physical page to the logical page when the third physical page is associated to the second physical page.

10. A storage apparatus that performs writing and reading of data to a plurality of physical drives classified into hierarchies, in accordance with data I/O requests sent from an external device,
provides to the external device a storage area of any of the plurality of physical drives in a unit of a logical unit that is a logical storage area,
configures the logical unit by assigning a physical page that is a unit of a storage area of any of the plurality of physical drives, to a logical page that is a unit of a storage area of the logical unit,
performs a first migration of the logical page by reassigning a first physical page to the logical page, the first physical page being the physical page provided by any of the plurality of physical drives of a first hierarchy that is the hierarchy higher than a second hierarchy that is the hierarchy of any of the plurality of physical drives providing a second physical page that is the physical page currently assigned to the logical page, and making contents of the second physical page identical with contents of the first physical page,
associates the second physical page with the first physical page and manages the two,
performs a second migration of the logical page by reassigning the second physical page to the logical page, when the first physical page is associated to the second physical page, at a time the second migration is performed by reassigning the physical page provided by any of the plurality of physical drives of the second hierarchy, to the logical page to which the first physical page is assigned,
wherein the storage apparatus when a third hierarchy that is the hierarchy lower than the second hierarchy exists, generates in the third hierarchy, a third physical page that is the physical page whose contents are identical to contents of the second physical page, as well as associates the second physical page and the third physical page and manages the two, at a time a third migration is performed by reassigning the physical page provided by any of the plurality of physical drives of the third hierarchy for the logical page to which the second physical page is assigned, performs the third migration by reassigning again the third physical page to the logical page, when the third physical page is associated to the second physical page.

11. A control method of a storage apparatus that performs writing and reading of data to and from a plurality of physical drives classified into hierarchies, in accordance with data I/O requests sent from an external device, wherein the storage device provides to the external device a storage area of any of the plurality of physical drives in a unit of a logical unit that is a logical storage area, configures the logical unit by assigning a physical page that is a unit of a storage area of any of the plurality of physical drive, to a logical page that is a unit of a storage area of the logical unit, performs a first migration for the logical page by reassigning a first physical page that is the physical page provided by any of the plurality of physical drives of a first hierarchy that is the hierarchy higher than a second hierarchy that is the hierarchy of any of the plurality of physical drives providing a second physical page that is the physical page currently assigned to the logical page, and making contents of the second physical page identical with contents of the first physical page, associates the second physical page with the first physical page and manages the two, and at a time a second migration is performed by reassigning the physical page provided by any of the plurality of physical drives of the second hierarchy, to the logical page to which the first physical page is assigned, performs the second migration by reassigning the second physical page to the logical page, when the first physical page is associated to the second physical page, wherein the storage apparatus cancels the association when, after the first migration, a content of the first physical page is changed before the second migration.

12. A control method of a storage apparatus according to claim 11, wherein the storage apparatus manages an access frequency for each of the logical page, starts the first migration or the second migration for the logical page when the access frequency of the logical page satisfies a predetermined condition.

* * * * *